(12) United States Patent
Doukhvalov et al.

(10) Patent No.: US 8,214,904 B1
(45) Date of Patent: *Jul. 3, 2012

(54) SYSTEM AND METHOD FOR DETECTING COMPUTER SECURITY THREATS BASED ON VERDICTS OF COMPUTER USERS

(75) Inventors: Andrey P. Doukhvalov, Moscow (RU); Anton V. Tikhomirov, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,975

(22) Filed: Dec. 21, 2011

(51) Int. Cl.
*H04L 29/06* (2006.01)
(52) U.S. Cl. .......................... 726/24; 726/26
(58) Field of Classification Search .............. 726/22, 726/23, 24, 25, 26
See application file for complete search history.

(56) References Cited

U.S. PATENT DOCUMENTS

| | | | |
|---|---|---|---|
| 4,964,077 A | 10/1990 | Eisen et al. | |
| 5,388,198 A | 2/1995 | Layman et al. | |
| 5,774,118 A | 6/1998 | Hatakama | |
| 6,233,570 B1 | 5/2001 | Horvitz et al. | |
| 6,931,622 B1 | 8/2005 | Aldrich et al. | |
| 6,990,379 B2 | 1/2006 | Gonzales et al. | |
| 7,089,553 B1 | 8/2006 | Glaser et al. | |
| 7,188,243 B2 | 3/2007 | Shell et al. | |
| 7,380,025 B1 | 5/2008 | Riggins et al. | |
| 7,493,591 B2 | 2/2009 | Charisius et al. | |
| 7,523,486 B1 | 4/2009 | Turner | |
| 7,530,106 B1 | 5/2009 | Zaitsev et al. | |
| 7,536,449 B2 | 5/2009 | Melo et al. | |
| 7,590,669 B2 | 9/2009 | Yip et al. | |
| 7,636,764 B1 | 12/2009 | Fein et al. | |
| 7,640,589 B1 | 12/2009 | Mashevsky et al. | |
| 7,647,625 B2 | 1/2010 | Grinstein | |
| 7,657,493 B2 | 2/2010 | Meijer et al. | |
| 7,664,724 B2 | 2/2010 | Lucovsky et al. | |
| 7,702,758 B2 | 4/2010 | Shrivastava et al. | |
| 7,730,040 B2 * | 6/2010 | Reasor et al. ................ | 707/690 |
| 7,743,419 B1 | 6/2010 | Mashevsky et al. | |
| 7,770,114 B2 | 8/2010 | Sriprakash et al. | |
| 7,774,827 B2 | 8/2010 | Kinser et al. | |
| 7,774,845 B2 * | 8/2010 | Shipman ........................ | 726/23 |
| 7,793,284 B2 | 9/2010 | Mason et al. | |
| 7,827,615 B1 | 11/2010 | Allababidi et al. | |
| 7,874,008 B2 | 1/2011 | Chang et al. | |
| 7,895,409 B2 | 2/2011 | Mendonca | |
| 7,979,493 B2 | 7/2011 | Rechterman et al. | |
| 8,059,810 B2 | 11/2011 | Erb | |
| 8,073,731 B1 | 12/2011 | Rajasenan | |
| 2002/0144151 A1 | 10/2002 | Shell et al. | |

(Continued)

*Primary Examiner* — David García Cervetti
(74) *Attorney, Agent, or Firm* — Arent Fox LLP; Michael Fainberg

(57) ABSTRACT

Disclosed are systems, methods and computer program products for detecting unknown security threats. In one example, a system receives from an antivirus application deployed on a user's computer information about an unknown security event associated with a software executing on the computer and a user's verdict indicating that the software is harmful or clean. The system identifies the user of the computer and a role of the user. The role indicates user's level of expertise in the field of computer security. If the user has a high level of expertise in computer security, the system accepts the user's verdict. If the user has a low level of expertise, the system analyzes the information about the security event to verify that the user's verdict is correct. If the user's verdict was accepted or verified to be correct, the system updates an antivirus database associated with the antivirus application.

20 Claims, 23 Drawing Sheets

U.S. PATENT DOCUMENTS

| | | | |
|---|---|---|---|
| 2003/0177394 A1* | 9/2003 | Dozortsev | 713/201 |
| 2003/0227482 A1 | 12/2003 | Bach et al. | |
| 2003/0229646 A1 | 12/2003 | Bach et al. | |
| 2004/0017397 A1 | 1/2004 | Bach et al. | |
| 2004/0172562 A1 | 9/2004 | Berger et al. | |
| 2004/0205419 A1* | 10/2004 | Liang et al. | 714/57 |
| 2004/0221171 A1 | 11/2004 | Ahmed et al. | |
| 2004/0225577 A1* | 11/2004 | Robinson | 705/26 |
| 2005/0004825 A1 | 1/2005 | Ehrler et al. | |
| 2005/0005160 A1* | 1/2005 | Bates et al. | 713/200 |
| 2005/0022014 A1* | 1/2005 | Shipman | 713/201 |
| 2005/0234931 A1 | 10/2005 | Yip et al. | |
| 2006/0015505 A1 | 1/2006 | Henseler et al. | |
| 2006/0026161 A1 | 2/2006 | Henseler | |
| 2006/0041644 A1 | 2/2006 | Henseler | |
| 2006/0075494 A1* | 4/2006 | Bertman et al. | 726/22 |
| 2006/0095963 A1* | 5/2006 | Crosby et al. | 726/22 |
| 2006/0184654 A1 | 8/2006 | Melo et al. | |
| 2006/0218548 A1 | 9/2006 | Mason et al. | |
| 2006/0224898 A1 | 10/2006 | Ahmed | |
| 2006/0248577 A1 | 11/2006 | Beghian et al. | |
| 2006/0277595 A1 | 12/2006 | Kinser et al. | |
| 2007/0038677 A1* | 2/2007 | Reasor et al. | 707/200 |
| 2007/0079356 A1 | 4/2007 | Grinstein | |
| 2007/0079357 A1 | 4/2007 | Grinstein | |
| 2007/0079369 A1 | 4/2007 | Grinstein | |
| 2007/0079384 A1 | 4/2007 | Grinstein | |
| 2007/0118903 A1* | 5/2007 | Bates et al. | 726/22 |
| 2007/0124283 A1* | 5/2007 | Gotts et al. | 707/3 |
| 2007/0150464 A1 | 6/2007 | Brave et al. | |
| 2007/0150465 A1 | 6/2007 | Brave et al. | |
| 2007/0260737 A1 | 11/2007 | Gomes et al. | |
| 2008/0016052 A1 | 1/2008 | Frieden | |
| 2008/0016053 A1 | 1/2008 | Frieden et al. | |
| 2008/0022370 A1 | 1/2008 | Beedubail et al. | |
| 2008/0072316 A1 | 3/2008 | Chang et al. | |
| 2008/0091613 A1 | 4/2008 | Gates et al. | |
| 2008/0109245 A1 | 5/2008 | Gupta | |
| 2008/0189560 A1 | 8/2008 | Case et al. | |
| 2008/0281578 A1* | 11/2008 | Kumaran et al. | 704/2 |
| 2008/0313716 A1 | 12/2008 | Park | |
| 2009/0003581 A1 | 1/2009 | Erb | |
| 2009/0013038 A1* | 1/2009 | Vogler et al. | 709/203 |
| 2009/0037686 A1 | 2/2009 | Mendonca | |
| 2009/0083220 A1* | 3/2009 | Petri | 707/3 |
| 2009/0094682 A1 | 4/2009 | Sage et al. | |
| 2009/0163278 A1* | 6/2009 | Kawanaka et al. | 463/40 |
| 2009/0178132 A1 | 7/2009 | Hudis et al. | |
| 2009/0210417 A1* | 8/2009 | Bennett | 707/5 |
| 2009/0216760 A1* | 8/2009 | Bennett | 707/5 |
| 2009/0259572 A1* | 10/2009 | Lay et al. | 705/28 |
| 2009/0282476 A1* | 11/2009 | Nachenberg et al. | 726/22 |
| 2009/0327911 A1 | 12/2009 | Ningune et al. | |
| 2009/0328209 A1* | 12/2009 | Nachenberg | 726/22 |
| 2010/0061250 A1 | 3/2010 | Nugent | |
| 2010/0100439 A1* | 4/2010 | Jutla et al. | 705/14.52 |
| 2010/0132016 A1 | 5/2010 | Ferris | |
| 2010/0146608 A1* | 6/2010 | Batie et al. | 726/7 |
| 2010/0179856 A1 | 7/2010 | Paretti et al. | |
| 2010/0205123 A1* | 8/2010 | Sculley et al. | 706/12 |
| 2010/0223666 A1 | 9/2010 | Weber et al. | |
| 2010/0238840 A1 | 9/2010 | Lu et al. | |
| 2010/0251328 A1 | 9/2010 | Syed et al. | |
| 2010/0332632 A1 | 12/2010 | Mason et al. | |
| 2011/0078590 A1* | 3/2011 | Hao et al. | 715/755 |
| 2011/0083011 A1* | 4/2011 | DiCrescenzo | 713/158 |
| 2011/0113491 A1* | 5/2011 | Altshuler et al. | 726/24 |
| 2011/0161452 A1* | 6/2011 | Poornachandran et al. | 709/207 |

* cited by examiner

| | Number of detected threats | Uniqueness of detected threats | Activeness in use of application interface | Frequency of computer infections |
|---|---|---|---|---|
| Typical User | low | low | low | low |
| Advanced User | low, average | average | average | low, average |
| Expert User | average | average, high | high | low |
| Lure User | high | low, average | low | high |

Fig. 12

SYSTEM AND METHOD FOR DETECTING COMPUTER SECURITY THREATS BASED ON VERDICTS OF COMPUTER USERS

TECHNICAL FIELD

The present disclosure generally relates to the field of computer security, and specifically to systems, methods and computer program products for detecting computer security threats based on verdicts of computer users.

BACKGROUND

Recently, more and more information technology companies have been looking into "cloud computing" technology to fulfill their Web hosting, data storage and processing needs. Cloud computing means data processing when the required computing capacities are provided as an Internet service. Therefore, the cloud computing clients don't need to worry about an infrastructure—this is done by the services provider. On the one hand, it is a very convenient tool for common users, which do not have to worry about complex software and hardware interfaces, but on the other hand, these responsibilities are transferred to the providers.

Cloud data processing means a distributed processing of various data types at various levels. In one case, that may mean provision of hardware and system software (Infrastructure as a Service) for use. In other cases, an entire platform for development, testing, applications support is provided (Platform as a Service). Currently, one of the most familiar options is the software provision service (Software as a Service). Other trends of hardware and software provision for some abstract and scalable service are also being developed. For simplicity, we will hereinafter call cloud data processing a "cloud service".

Currently, there are many different cloud computing options. For example, Google Apps allows editing various types of documents on line, with only an Internet browser, while the data is stored on Google servers. One of the latest Google developments—the Chrome operating system (OS)—also uses browser in the key role of a tool for access to other resources, providing for reduced client computer (such as netbook) loading, good reliability and simplicity of operation (the entire infrastructure is located on the server). Another good example of cloud computing is the OnLive platform, which offers real time enjoyment of the latest computer games even on computers with very limited hardware capabilities (same netbooks or tablets) by processing all the game data on the server and its transmission to the client in a multi-media format. Microsoft is currently developing its Azure platform for creation of distributed web applications. The platform operating principles solve the scaling and resource access issues in exchange for subscription fee for used resources.

FIG. 1 illustrates a high-level schematic diagram of the above-described cloud services. A cloud service 120 is shown as software and hardware resources 110, which may be requested by users of personal computers (PC) 100. This model development is being currently actively pursued and, as noted earlier, it puts upon the cloud service 120 provider significant responsibilities associated with such issues as user data safety and security, as well as convenient scalability of the provided software and hardware resources 110.

Considering the cloud computing advantages, it is no wonder that it attracted interest of antivirus software companies which lately saw the number of threats increasing beyond all conceivable limits. Hereinafter, threats will mean various malicious software such as Trojans, network worms, viruses, and other undesirable software, as well as links to web pages with malicious and other undesirable software, licensed software vulnerabilities, etc. Undesirable software may include crimeware, spyware, and software blocking data or computer operability (ransomware). FIG. 2 illustrates quantitative growth of new unique malware files intercepted and analyzed by ZAO Kaspersky Laboratory. It is evident that the growth is clearly exponential, which is determined by a number of recently arising causes. At the same time, capabilities of antivirus companies—hardware for processing new threats, as well as personnel (virus analysts)—are fairly limited and cannot be increased at the same pace with the volume of threats. One of the reasons for the increase of new unique malware volume is the massive development of telecommunications, including the Internet, and the corresponding fast growth of quantity of users. This, in turn, stimulates development of various web-based online services: Internet banking, virtual money (such as WebMoney), live journals and blogging, migration of many software structures to the web (the already mentioned Google Apps is a good example). Correspondingly, the current generation of cybercriminals is actively using their developments in the form of malware for web attacks designed to steal and extort money. As of late, their activities have affected not only the banking (so-called bank Trojans), but have spread into hacking popular online games accounts, as well as extortions using Trojan-Ransom type software. A number of factors enable their success and the corresponding increase in malware as shown in FIG. 2: insufficient security of many online services, shortcomings or complete absence of Internet crime laws in a number of countries and sometimes just basic illiteracy of computer users regarding computer security.

It shall be admitted that the existing methods of malware protection, represented usually by signature and heuristic detection, are practically exhausted their potential. Heuristic analysis is based on search of specific features peculiar to malware (code fragments, certain register keys, filenames or processes), but debugging of each heuristic scan scenario takes a lot of time and the risk of errors (false positive detection) is always present. The efficiency of heuristic detection methods is currently stalled at 60-70%, which is actually the maximum possible level.

The traditional signature analysis still allows to quickly and precisely identify a malware, but only if it is known. The signatures are being constantly updated (as of now, already on the hourly basis), which brings about an evident negative—such protection by its nature allows malware some time to spread as shown in FIG. 3. There may be hours or even days from the moment of malware release before a virus protection company obtains its sample (usually executable file), analyses it, detects its malicious behavior, puts it in signature database, and tests it before updates are released to the antivirus servers. The entire process may take hours and sometimes days, with the situation being constantly exacerbated by the fact that it is not always possible to automate all the malware detection procedure steps.

Currently, other detection methods based on different principles are being actively developed by virus protection industry. Symantec's technique is based on so-called Wisdom of the Crowd using reputation for the unknown executable file. The reputation is created by users which manually determine the degree of danger represented by the file. This is not a new idea—James Surowiecki book "The Wisdom of Crowds" contains a theory based on interesting facts that a large group of non-experts may make better decisions than the experts.

Therefore, the more users "voted" the file as malicious, the more "malicious" reputation is assigned to such file. On the one hand, it allows relying on majority opinion, but at the same time that factor is an error generator due to the fact that the majority of users is not computer security experts and therefore may make wrong decisions, which may result in blocking anon-malicious software. Moreover, the vast majority of malware belongs to the Trojan class, i.e. the programs which "imitate" safe and useful programs, which causes inexperienced users to easily trust them. If common software, such as a calculator (calc.exe) is infested with a virus, a common user, not possessing sufficient level of expertise, will not be able to come to correct conclusion.

Another technology, such as McAfee's Artemis, offers to analyze the unknown executable file fingerprints. This technique sequence starts with user's antivirus application detecting a suspicious file, for example, encrypted or packed. Hereinafter, packed file shall mean an executable file, which was specially compressed and contains additional unpacking routines. UPX is a classic example of the program for compression of executable files. After detection of a suspicious file, which was not found in the local (i.e. user side) 'whitelist' and 'blacklist' software database, an antivirus application transmits an executive file imprint (hash-sum) to the server where the imprint is checked for being a malware hash-sum. This eliminates the FIG. 3 problem associated with the time delay in users' database updates. But this approach is also not free of drawbacks, since the virus protection company must possess the imprint (hash-sum) of the particular file ('clean' or malware), which, in turn, leads to a problem of timely obtaining that file by virus protection company. Since huge quantities of executable files are generated every minute, it is very difficult to promptly obtain such files.

But the latest successful developments in cloud computing area currently led to creation of a range of related problems. One of them is associated with the case that when a large number of users are working with the cloud service, each user at any moment in time is most commonly perceived as a unit with equal rights and capabilities for all. Commercial cloud services use various business models for differentiating user capabilities. For example, Azure will charge different fees for using different resource volumes. But if the users themselves directly participate in the cloud service operations, it becomes necessary to split them into groups using some criteria set, which will enable to better organize the service operations and, in particular, for faster and more precise threat detection. This, for one, is applicable to the "Wisdom of the Crowd" technique.

The present invention is concerned with a solution of the task of using many users' expertise in malware detection by creating user classes and subdividing them in accordance with their roles.

SUMMARY

Disclosed are systems, methods and computer program products for detecting computer security threats based on verdicts of computer users. In one example embodiment, a system receives from an antivirus application deployed on a user's computer information about an unknown security event associated with a software executing on said computer and a user's verdict indicating that the software is harmful or harmless to the security of the computer. The system identifies the user of said computer and a role of said user, wherein the user's role indicates user's level of expertise in the field of computer security. If the role of said user indicates that the user has a high level of expertise in the field of computer security, the system accepts the user's verdict that the software is harmful or harmless. If the role of said user indicates that the user has a low level of expertise in the field of computer security, the system analyzes the information about the security event received from the antivirus application to verify that the user's verdict is correct. If the user's verdict was accepted or verified to be correct, the system updates an antivirus database associated with the antivirus application and containing information about known harmful and harmless software, with said information about the security event and indication that associates software is harmful or harmless.

Also disclosed are systems, methods and computer program products for dynamically allocating computing resources for processing security information. In one example embodiment, the system receives from an antivirus application deployed on a user's computer information about user's actions related to the security of said computer. The system analyzes the user's actions related to the security of said computer to determine user's level of expertise in the field of computer security. The system then classifies the user into one of two or more different roles based on the user's level of expertise in the field of computer security. The system automatically selects, based on the user's role, configuration setting of the antivirus application for collecting information about security threats detected by the user, wherein more information about security threats detected by a user is collected by from a user with higher level of expertise in the field of computer security than a user with lower level of expertise in the field of computer security. The system also automatically allocates and configures, based on the user's role, computing resources and services for processing information collected by the antivirus application deployed on the user's computer about security threats detected by the user, wherein more computing resources and services are allocated to processing information from a user with higher level of expertise in the field of computer security than to a user with lower level of expertise.

Also disclosed are systems, methods and computer program products for method for classifying users of antivirus software based on user's level of expertise in the field of computer security. In one example embodiment, the system receives from antivirus software deployed on a user's computer information about security of the user's computer and history of user's usage of the antivirus software. The system categorizes the received information into a plurality of categories, including at least (i) a number of computer threats detected by the user, (ii) a frequency of malware infections of the user's computer, and (iii) a level of user's proficiency with the antivirus software. The system then selects one or more condition-action rules for each category of information and applies the selected condition-action rules to the categorized information to determine user's level of expertise in the field of computer security. Finally, the system classifies the user as one of an expert user, advanced user or typical user based on the determined user's level of expertise in the field of computer security.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings:

FIG. 12 illustrates a sample diagram of cloud service user roles according to one example embodiment.

DETAILED DESCRIPTION OF EXAMPLE EMBODIMENTS

Figure 1:
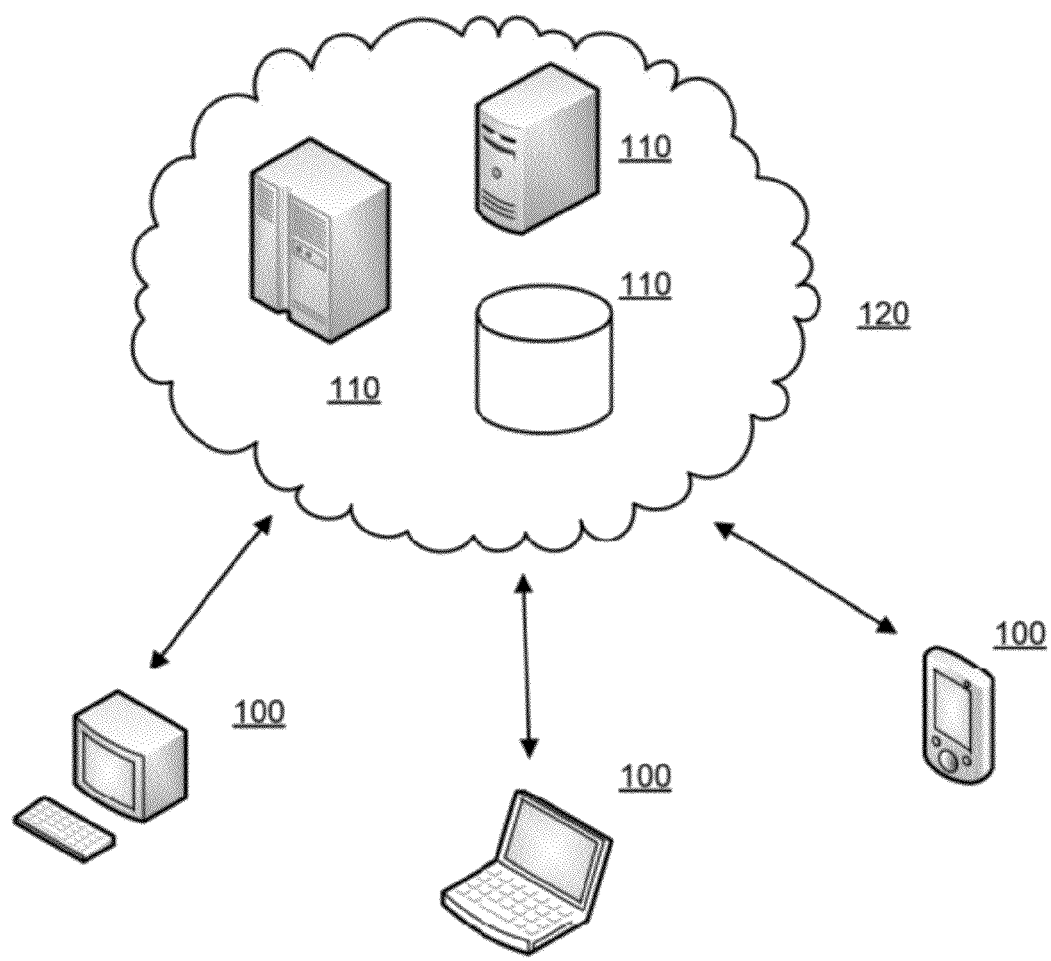
FIG. 1 illustrates a high-level schematic diagram of a cloud service.

Example embodiments of the present invention are described herein in the context of systems, methods and computer program products for detecting computer security threats based on verdicts of computer users. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Although example embodiments of the present invention are directed to providing computer security-associated services in a cloud computing environment, those of ordinary skill in the art will appreciate that in other embodiments the principles of the present invention may be used in other computing paradigms, such as on a client side, on the server side, in a distributed computing environment, etc.

Initially, we will discuss issues of classification of cloud service users (clients) and protection of the cloud service and its users from various computer threats.

Current computer security products, such as antivirus software or security systems, contain a large number of modules employed for various solutions. FIG. 3a shows an example of the current antivirus software 300, which may be installed on the user device 100. Some modules are vital for the software operation—such as update and file antivirus modules. An update module is designed primarily for antivirus database updates, the up-to-date status of such databases providing for reliable operation involving timely detection of malware and other threats. It should be noted that threats may be represented by the known malware, links to harmful content (harmful resource addresses), as well as unknown malware and potentially dangerous software able to perform actions similar with those of malware (things like covert installation are characteristic for many malware programs). Antivirus databases themselves may contain such things as known malware signatures, the necessary anti-spam module operating data set, etc. Antivirus databases also include external services, such as databases of antivirus companies, which may contain a large knowledge base, such as a 'whitelist' base containing trusted software information. We will regard external services as a cloud service 120. Other modules, such as e-mail antivirus, web antivirus, IM antivirus (checking instant messaging data), network firewall, are required depending on availability of various options, such as e-mail or Internet. Others are auxiliary tools: anti-spam module for filtering incoming e-mails, backup module, personal data manager (for isolation and protection of the most important data), and virtual keyboard for secure data entry without being endangered by such programs as keyloggers. Some modules, like anti-banner, can be used with a web browser during Internet surfing. Some modules require a lot of time and resources for operation, but they can handle yet unknown malware and attacks. These modules include, but not limited to: HIPS (Host Intrusion Prevention System), which limits unknown software access to computer resources; Proactive Defense Module, which is able to determine active infection phase (i.e. the moment when malware already started its operations in the computer); Emulator and Virtual Machine, which may be used for safe execution of unfamiliar executable files. This accessory list may differ from one antivirus software to another—various modules may have different names, some modules may be built into other modules, etc.

Generally, each module of the antivirus application 300 may have its own user-interface and associated functions. For example, an anti-spam module offers capabilities to train the module, compile trusted address and blocked source lists, create permitted and obscene phrase lists, etc. The HIPS module allows user to install and revise resource access rights for certain software, to make various programs trusted, to form software groups based on trust level. Thus, each module has its own level of user interface for obtaining additional information. Even as the majority of modules operate in automatic mode, some operations still require user's input. All this serves as a reminder that in the world of constantly increasing volume of computer threats the user's ultimate actions still play significant role, notwithstanding the automation of the majority of antivirus software modules.

It should also be noted that the user input is required only in cases when one of the antivirus software modules cannot come to a positive conclusion regarding threat of a suspicious object, such as an unknown file the user is trying to execute or a link the user is trying to follow in a browser. Such modules which may ask for user's decisions or verdicts, whether the object is harmful or harmless, may include a proactive defense module and virtual machine. Moreover, the importance of such modules is constantly increasing as the threats are developing. Thus, there is a need in obtaining user decision, but selecting for this purpose the most competent users able to avoid the earlier described mistakes. Therefore, it is necessary to conduct selection (classification) of the cloud service users in order to detect the most competent ones from the computer security knowledge standpoint.

User classification means selection of some common features for grouping of users into some categories. The categories may be pre-defined and relate to various aspects of user's activities within the antivirus software framework: number of detected threats, their uniqueness, proficiency with user of antivirus software interfaces, frequency of infections of the computer, information about programs installed on the user's computer and the user's usage of said programs, etc.

The activity for each feature may be expressed as some value, say, numerical. For simplification of presentation and better evaluation, numerical values may correspond to a term set used in fuzzy logic. The fuzzy logic system contemplates three phases:

Fuzzification—introduction of fuzziness. In this operation, all input variables are matched with linguistic variables, term sets are created for each linguistic variable and membership functions are made for each term. For example, the term set for the linguistic variable "number of detected threats" will be ("very small", "small", "average", "high", "very high"), which will allow for move away from large quantity of numbers.

Creation and use of a fuzzy knowledge base. The fuzzy knowledge base consists of condition-action rules of IF<hypothesis of rule> THEN <conclusion of rule> type. For example, the following rule may be used: "IF number of detected threats exceeds the set value, THEN the quantified detected threats activity is high". Making such rules is usually easy, since they are understandable and are the "verbal code" of sorts.

Defuzzification—output of a distinct number, which is, for example, an evaluation of some user activity, which indicates user's level of expertise in the field of computer security.

Figure 4:
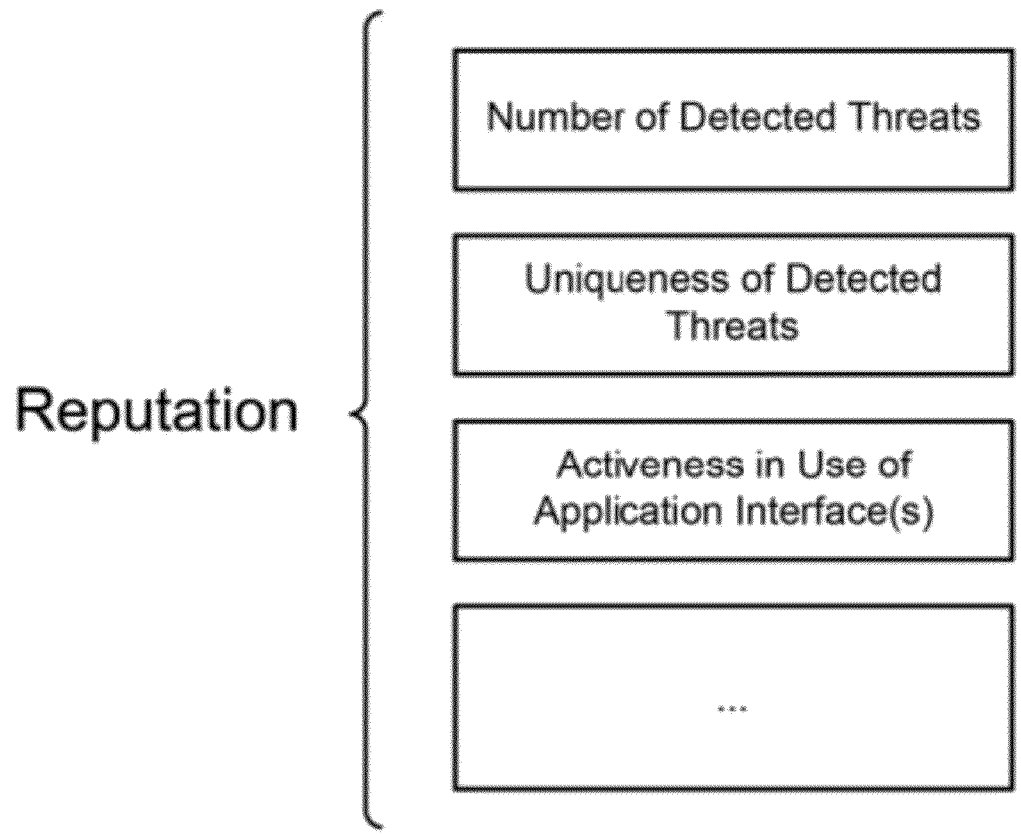
FIG. 4 illustrates a sample parameter set constituting user's reputation according to one example embodiment.

The obtained activity values for each feature may be interpreted together as a single notion which we will call a 'reputation'. In general, user's reputation indicates user's level of expertise in the field of computer security. Various reputation aspects are used for users' role determination, i.e. for their classification to be described later. FIG. 4 illustrates a sample parameter set for creating a reputation. It should be noted that a reputation may be represented by a number in one embodiment or by some set of features or a vector in others.

Figure 4A:
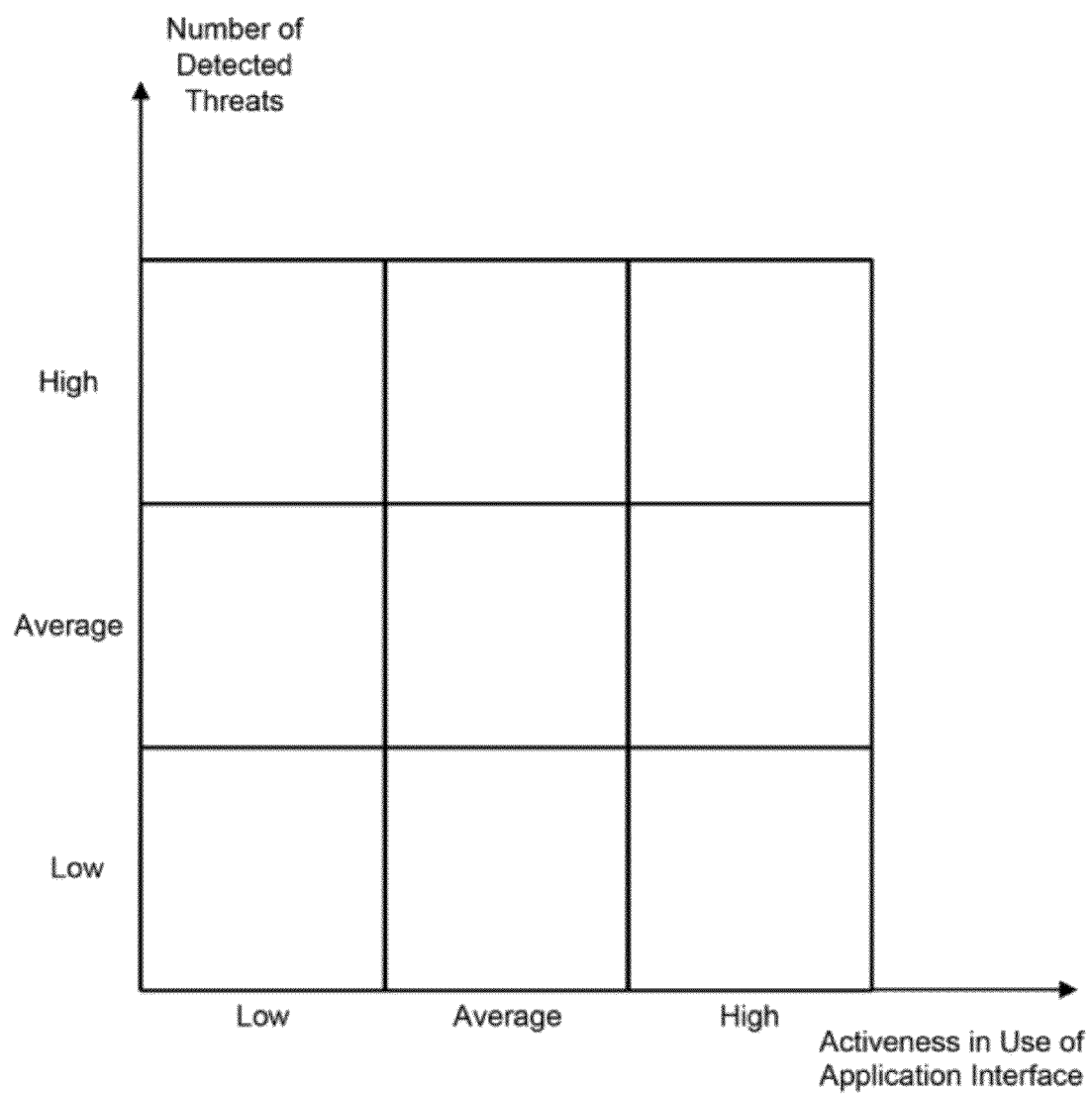
FIG. 4a illustrates a user's reputation graph as a function of its parameters from FIG. 4 according to one example embodiment.

If reputation is expressed as a set of numbers, rather than a single value, then the reputation may be schematically represented as a set or vector. FIG. 4*a* shows an example of such representation where two activity parameters are used—number of detected threats and software interface use activity. Therefore, the user reputation may be expressed as follows:

TABLE 1

|  | Number of detected threats | Application interface use activity |
| --- | --- | --- |
| User 1 reputation | Low | Average |
| User 2 reputation | High | High |

When other activity types are added, the reputation will have the following general representation: Reputation={Activity1, Activity2, . . . , ActivityN}.

Figure 5:
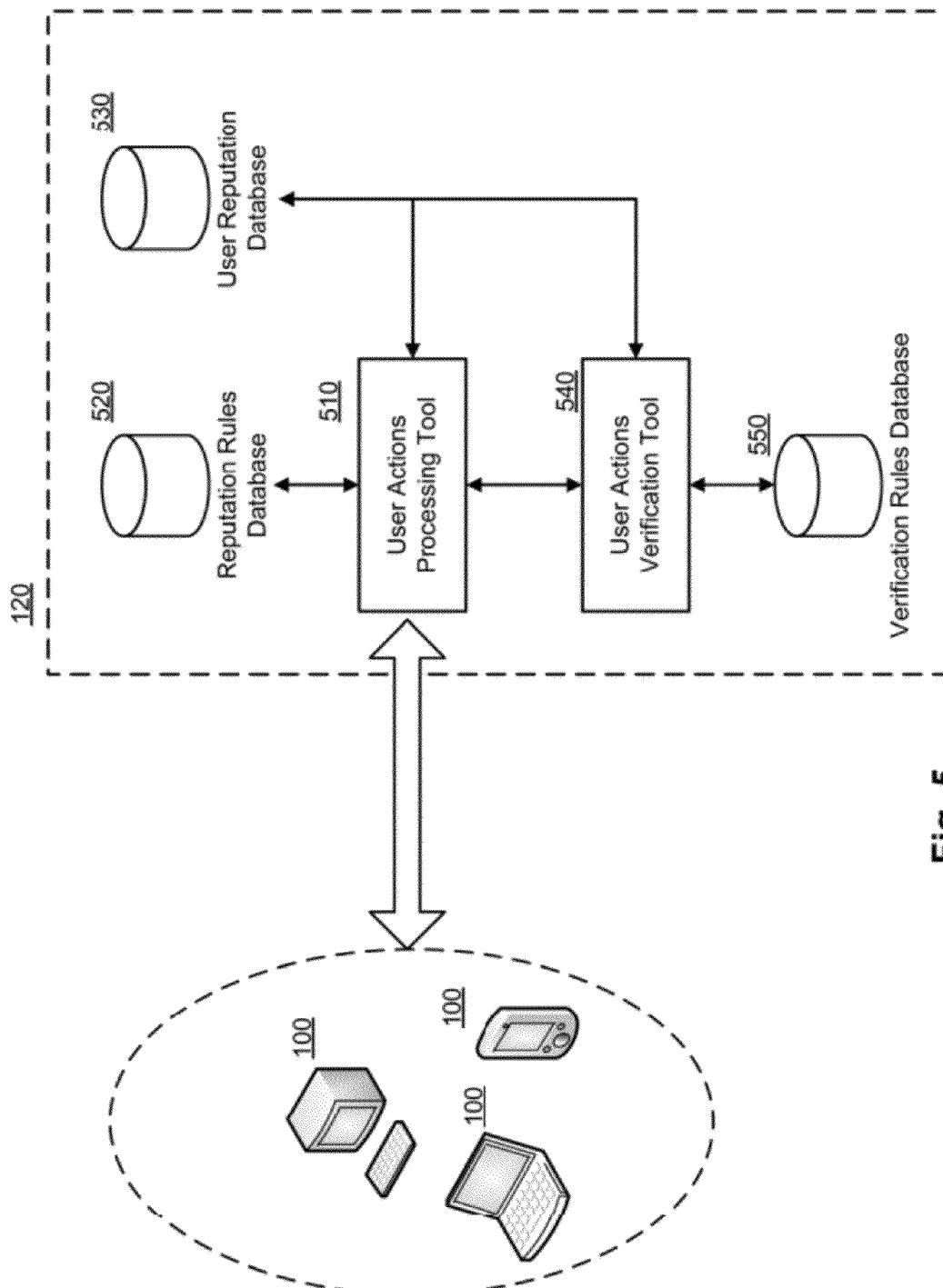
FIG. 5 illustrates a reputation analysis system for cloud service users according to one example embodiment.

FIG. 5 shows a reputation analysis system for cloud service users according to one example embodiment. Actions of the users 100 are logged at their locations and transmitted to the cloud service 120. Transmission may be in the form of notifications sent immediately after the action or from time to time. The received notifications enter a user actions processing tool 510 which references a reputation rules database 520 to process user's actions for certain activities. The user actions processing tool 510 also transmits the received notifications to a user actions verification tool 540. The user actions verification tool 540 uses a verification rules database 550 for checking if the user's actions are within the set limits. If the user's actions do not create any doubts, the user actions processing tool 510 revises the user reputation by changing the corresponding user activities values and storing them in a user reputation database 530.

Below is one example of a notification:

TABLE 2

| User ID | User: John Doe |
| --- | --- |
| Notification type | Threat was detected |
| Details | Used module: Emulator |
|  | Filename: XXX.exe |
|  | MD5-sum: . . . |
| User actions | File blocked, placed into quarantine |

Another example of a notification:

TABLE 3

| User ID | User: John Doe |
| --- | --- |
| Notification type | User actions |
| Details | Launched computer vulnerabilities scan |
| User actions | List of removed vulnerabilities: |
|  | Automatic launch of removable |
|  | drives switched off |
|  | Temporary browser files deleted |

User ID may also include antivirus software data, such as: antivirus software version; exact software ID; integration number; applied patches/security updates/security packages IDs; license information.

A unique data set is generated for each task. For example, for file verification that may include file information (hashsum, availability of digital signature, size, location, command line attributes, author (if any), file attributes (hidden, archived), received from (network, media such as CD), time of the last revision, etc.), a web page verification task may include page address (link), verification settings for a scenario emulator (what scenario types to verify, to what depth, what objects shall be verified), etc.

The user actions may be described by set templates designed to work with, the antivirus software interface (GUI). The following may be used as an example:

TABLE 4

| Action ID | Action type |
| --- | --- |
| ... | ... |
| 12 | User qualified a program as Trusted |
| 13 | User disabled program execution |
| ... | ... |
| 46 | User launched Virtual Keyboard |
| 47 | User launched Parent Control |
| ... | ... |

Such detailed data, as a rule, are transmitted by various antivirus software modules. For example, for an emulator this may include information on the number of instructions, operation codes, information regarding set operating restrictions, virtual memory dumps. In one example embodiment, the detailed data may be transmitted by a module or plurality of modules in a notification when the threat is detected by said module(s). In another detailed example, a portion of the data may be transmitted in a first notification and if this data will turn out to be insufficient to verify user verdict, additional data may be transmitted by the antivirus application 300 modules upon request from the cloud service 120.

Thus, all notifications may be described with a structure which includes such metadata as: WHO (information about the user, his computer, etc.), WHERE (information about triggered antivirus software modules and other required system hardware and software state data), WHEN (the event time frame and possibly repeat frequency), WHAT (type of the detected security event and the details of the security event).

Databases 520, 530, 550 (and all other similar databases discussed below) may be implemented with a common DBMS such as MySQL, MSSQL, PostgreSQL, DB2, etc. The user actions processing tool 510 uses the user notification comparison with the rules stored in the reputation rules database 520. These rules may be represented as production rules of type "IF <condition> THEN <action>". The following may be used as examples:

IF
      <notification type>="User action(s) ID(s)"
      <details>="Launch of computer vulnerabilities scan"
      <user actions>="Correction of detected vulnerability:
         Automatic launch of removable drives switched off"
   THEN
      RAISE   <activity with application interface>
         BY<set_value>
   LIMITATIONS: <the activity value cannot exceed N>

It is worth noting the organizational simplicity of these rules, since it is easy to add new rules and amend the existing ones. The rules may be in the XML language, the syntax of which provides such advantages as independence from the platform, ability to describe such structures as lists and trees, support at various levels (hardware as well as software).

Additionally, each rule may have limitations to revision of one or another activity of the user. The purpose of this is to prevent raising activity to a high level as a result of multiple but simple actions. A good example may be frequent scans of the same removable drive (such as a flash disk) which is considered simple and common application of software. But launch of a computer vulnerabilities scan is not a trivial check, which indicates that this action may raise the software interface activity to a higher level.

After verification that triggers a rule contained in the reputation rules database 520, the user actions processing tool 510 references the user reputation database 530 to revise the reputation of the user who sent the notification. The user actions verification tool 540 using rules from the verification rules database 550 is also used for revision of the reputation. The rules and their verification are organized similarly to the reputation rules database 520 rules. Let's review in more detail the necessity to verify users' actions.

Notwithstanding the fact that the users' actions processing logic is hidden from them at the cloud service 120, some users may employ deceitful tactics in order to increase their reputation. This may include, but is not limited to, falsification of notifications by the users 100, or artificial increase of such things as quantity and uniqueness of detected threats, or very high activity with the software interface. Such actions are called anomalies. To counter such actions, the verification rules database 550 contains anomaly detection rules. The user actions processing tool 510 transmits the notification received from a user to the user actions verification tool 540. The user actions verification tool 540 references the verification rules database 550 to determine the rule describing a certain anomaly type and also references the user reputation database 530 to request the reputation revision history for the user from whom the notification was received. The history stored in the user reputation database 530 shows the last actions of that user (notifications received) during the recent time period (such time period may be a month or a week). The user actions verification tool 540 is able to detect anomalies by comparing the historical records with the latest user notifications.

Figure 6:
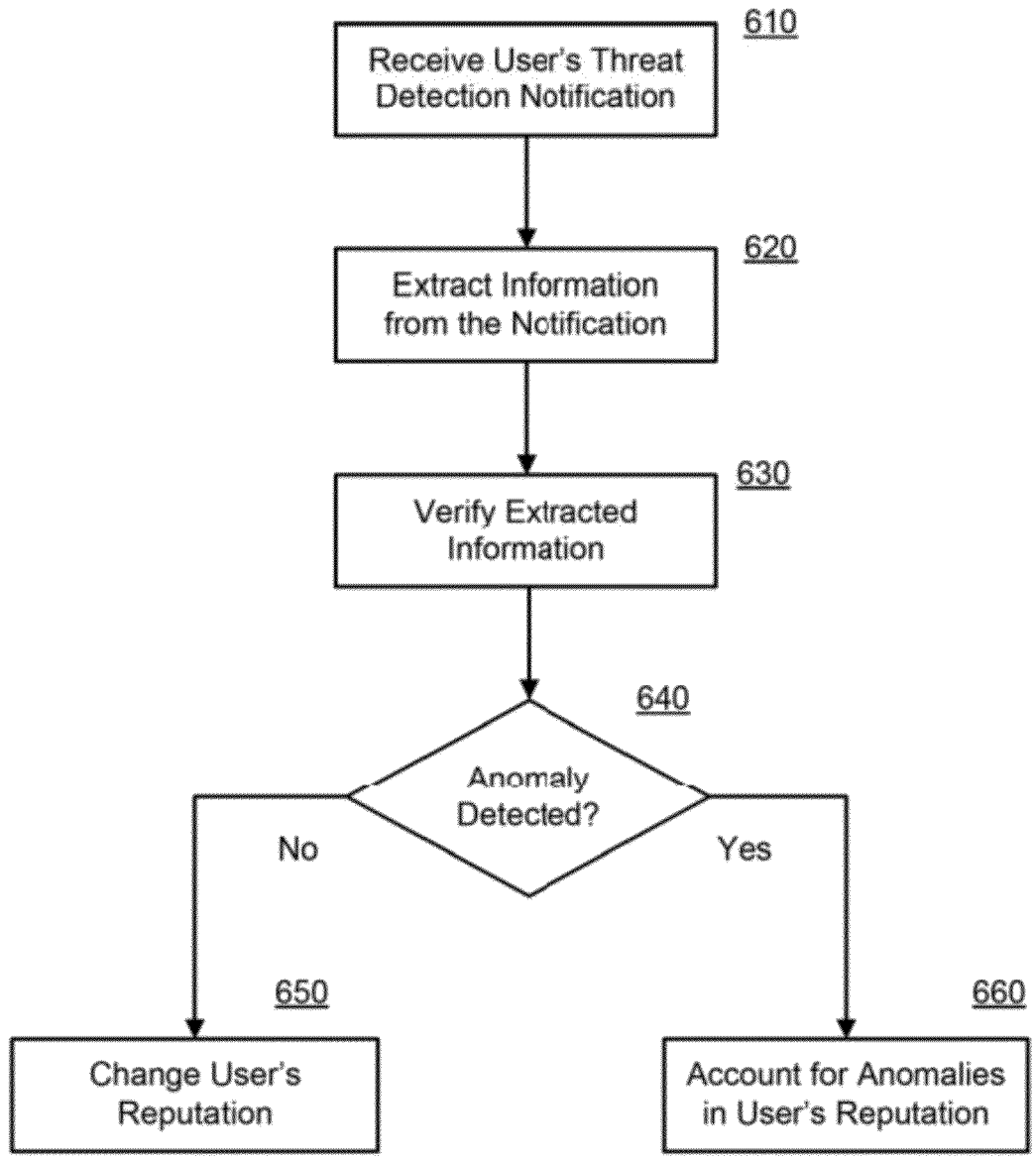
FIG. 6 illustrates a user notification processing method according to one example embodiment.

Let's take a more detailed look at the user's notification processing as illustrated in FIG. 6. User's action notification arrives at step 610 to the user actions processing tool 510, which extracts information from the received notification at step 620. Then at step 630 the received data are verified with the user actions verification tool 540. If at step 640 an anomaly is detected, then at step 660 a corresponding log entry may be made in the user reputation database 530 regarding the anomaly recorded for this user. If no anomaly is detected, then at step 650 the reputation (the relevant activities) will be revised. Methods of anomaly quantities and types registration will be later described in more detail.

Below, some examples, primarily associated with threat detection, are reviewed by reputation aspect (i.e. activities by feature).

As was noted above in the "Wisdom of the Crowd" method description, each user possesses a different level of information technologies (IT) knowledge. Currently, besides the large quantity of legally used (whitelist) programs and harmful (blacklist) programs, a growth of the so-called 'graylist' programs, which cannot be characterized as 'white' or 'black' has been noted. This is associated with many factors, but one of the basic ones is the continuous increase of executable files in general, as well as that of harmful programs (FIG. 2), which causes antivirus companies to fall behind in their ability to process the continuously increasing data stream. Therefore, in cases when antivirus software is unable to determine if an unknown file is harmful or clean, one of possible solutions may be to rely on the user's to evaluate whether the file is unknown harmful or clean. The user may be offered a brief file description, such as: size, location, filename, availability of a digital signature, etc. Moreover, the user may have information unavailable to antivirus software, such as the file source (from an unlicensed disk purchased in a store, mailed by a friend a long time ago, etc.). The user may, based on this information, decide on possible blocking of such file execution, which means that the user considers that file suspicious or harmful. We will call such event a 'verdict'. Besides an unknown file execution permission or blocking verdict, there are also verdicts on permission/blocking of link opening (e.g. in a browser), network activity, etc.

Therefore, each user may be evaluated by a number of his verdicts, as well as by their level of correctness. The verdict correctness may be later calculated by an antivirus company which verifies the executable file data and makes its conclusion regarding the user's conclusion about the file being harmful or clean. One of the embodiments also takes into account the quantity of unique cases—when a user several times blocks various copies of the same program (i.e. the same file), such verdict may be counted as a single event. Another embodiment does not immediately evaluate user's verdict activities, but introduces a time delay, excluding cases of abrupt user reputation fluctuations (such as in case of the initial antivirus software installation by a user). Also, verdicts evaluation in yet another embodiment may be conducted for the entire user activity period (usually, such period is limited by the antivirus software license validity term), as well as for a set time period.

It is also worth to keep in mind the associated anomalies (deceptions), which users may employ in order to obtain higher activity levels based on the number of detected threats, such as using the available harmful file sets for their subsequent scanning. A common user, as a rule, does not detect many threats in his computer during a short time period. Even a full scan of hard disks shows that the majority of malware are often copies of the same program.

Figure 7:
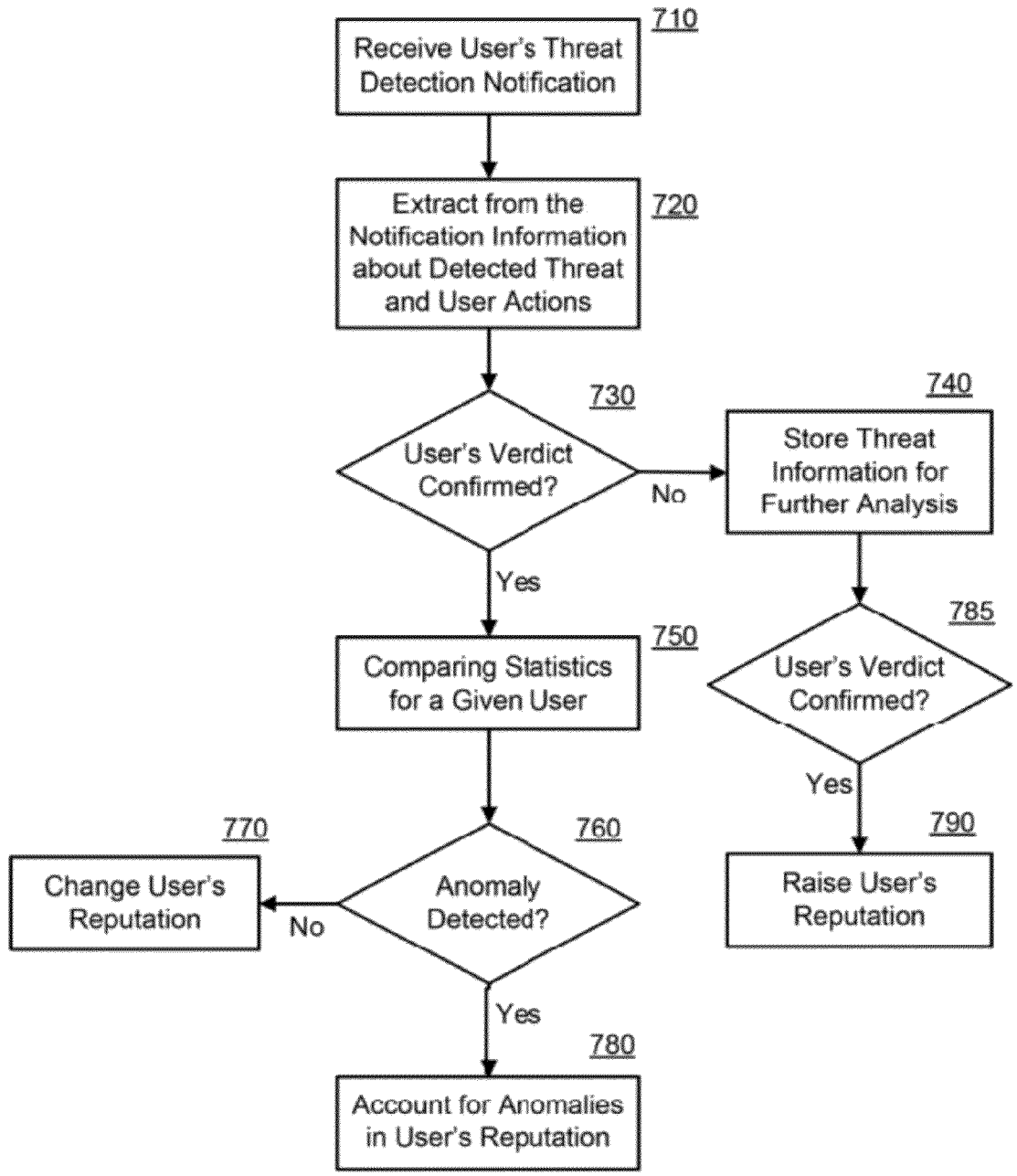
FIG. 7 illustrates a threat detection notification processing method according to one example embodiment.

FIG. 7 shows a threat detection notification processing sequence. After receipt at step 710 of an unknown threat detection notification, at step 720 the necessary information is extracted from that notification for further analysis. The necessary information includes the threat details, as well as the user actions. It is worth noting that the user actions are required only in cases when one of the antivirus software 300 modules is unable to make a clear conclusion regarding the subject of inquiry—for example, an unknown file which the user tried to launch, or link which the user was trying to follow in a browser. Such events are also tied into the notification. The threat information is then analyzed at the cloud service at step 730 to confirm whether user's verdict is correct or not. The analysis may be based on the Kaspersky Security Network (KSN) technique some embodiments of which are described in U.S. Pat. Nos. 7,640,589 and 7,743,419, which are incorporated by reference herein in their entirety. For example, verification process may include whitelist or blacklist analysis of the unknown threat, emulation-based analysis, signature-based analysis, heuristic analysis and other techniques.

If the threat is not confirmed, but the user's actions indicate that he believed, for example, an unknown file during its execution (opening) attempt to be malware or blocked an unknown link during attempt to follow it in a browser, such information will be saved for further analysis at step 740. If later, at step 785, the user's actions will be confirmed as correct (i.e. the verdict was correct), that will mean that he was among the first users to detect a malware or harmful link. In this case, the user's reputation will be revised at step 790, in particular, his activity judged by the number of unique detected threats will be increased.

If at step 730 the threat is confirmed, then at step 750 the user actions verification tool 540 references the verification rules database 550 and the user reputation database 530 to compare the notifying user's statistics in order to detect an anomaly case at step 760. An anomaly may be expressed in detection of too many malware programs (for example, scanning a disk with saved known malware collection in order to increase reputation) or too frequent malware detection during a short time period. The latter may be explained by a low sophistication level of the user visiting the same infected sites, not patching vulnerabilities in his software, etc. Such anomaly will be taken into account at step 780. Otherwise, at step 770 the user's reputation will be raised, due to increase in the number of detected threats. In addition, once the threat has been confirmed the cloud server 120 may update antivirus databases associated with the antivirus software 300 with information about detected threat.

A very important aspect of detecting of anomalies is in the rejection of those notifications that are trying to restart the service 120. For example, writers of malicious programs may be trying to turn off antivirus protection for users by employing DoS attacks on service 120. This can be accomplished by using multiple copies of anti-virus application 300 with automatic list of actions (e.g., detection of different copies of the same malicious program in a short period of time) that will cause a huge number of notifications to be sent to the service 120, which in fact will result in DoS attack. Turning off analysis of the notification from such customers will result in steady operation of the service 120 for all other users. In another example, writers of malicious programs can "slip" anti-virus application 300 (and therefore—and the service 120) incorrect responses—for example, indication that clean software is malicious. In order for their responses not to extend to other users, the service 120 may collects statistics of such detections and, if such false positives are too many—it is also an anomaly, and the responses from these users are also discarded.

Figure 2:
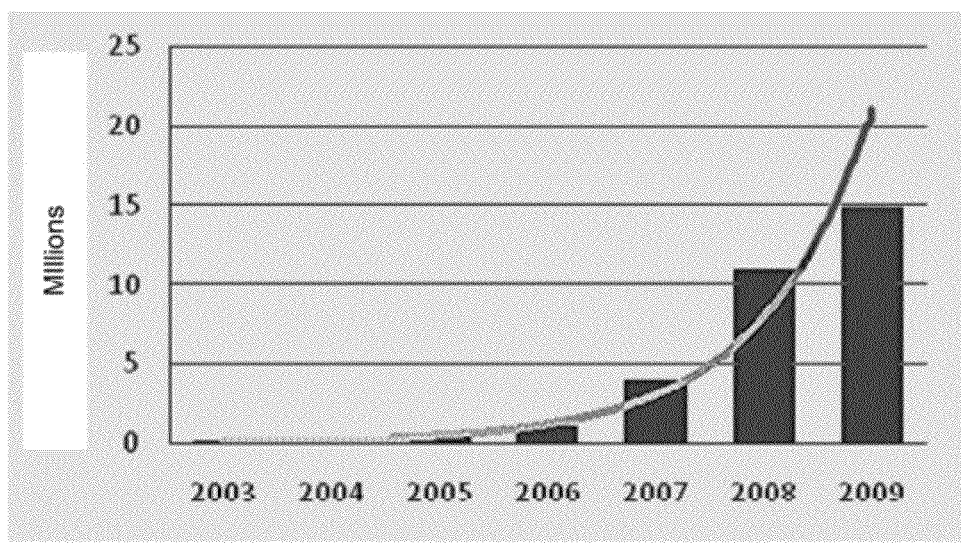
FIG. 2 illustrates a diagram of the recent increase in spread of computer malware.
Figure 3:
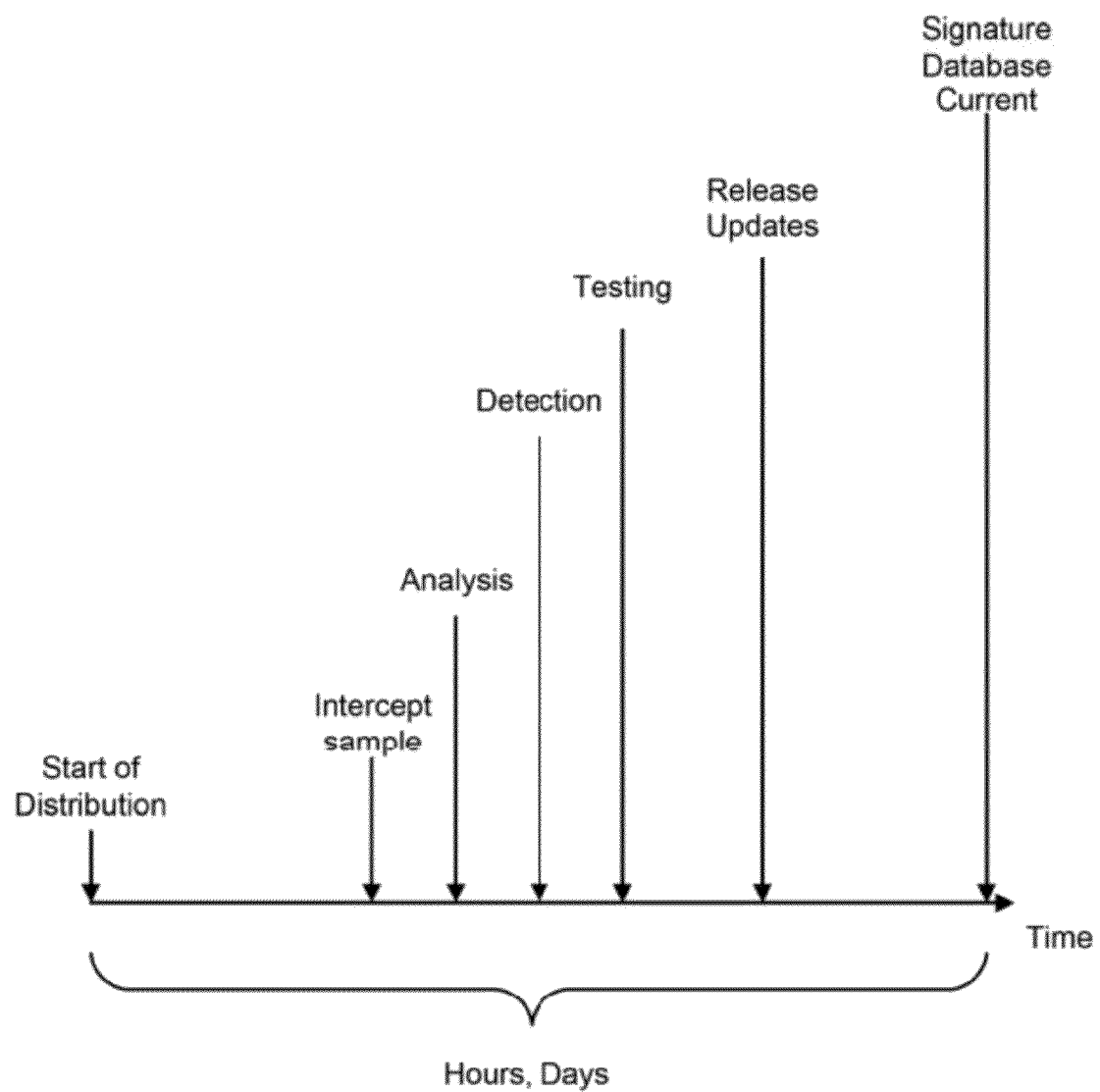
FIG. 3 illustrates a timeline of distribution to detection of new computer malware.
Figure 3A:
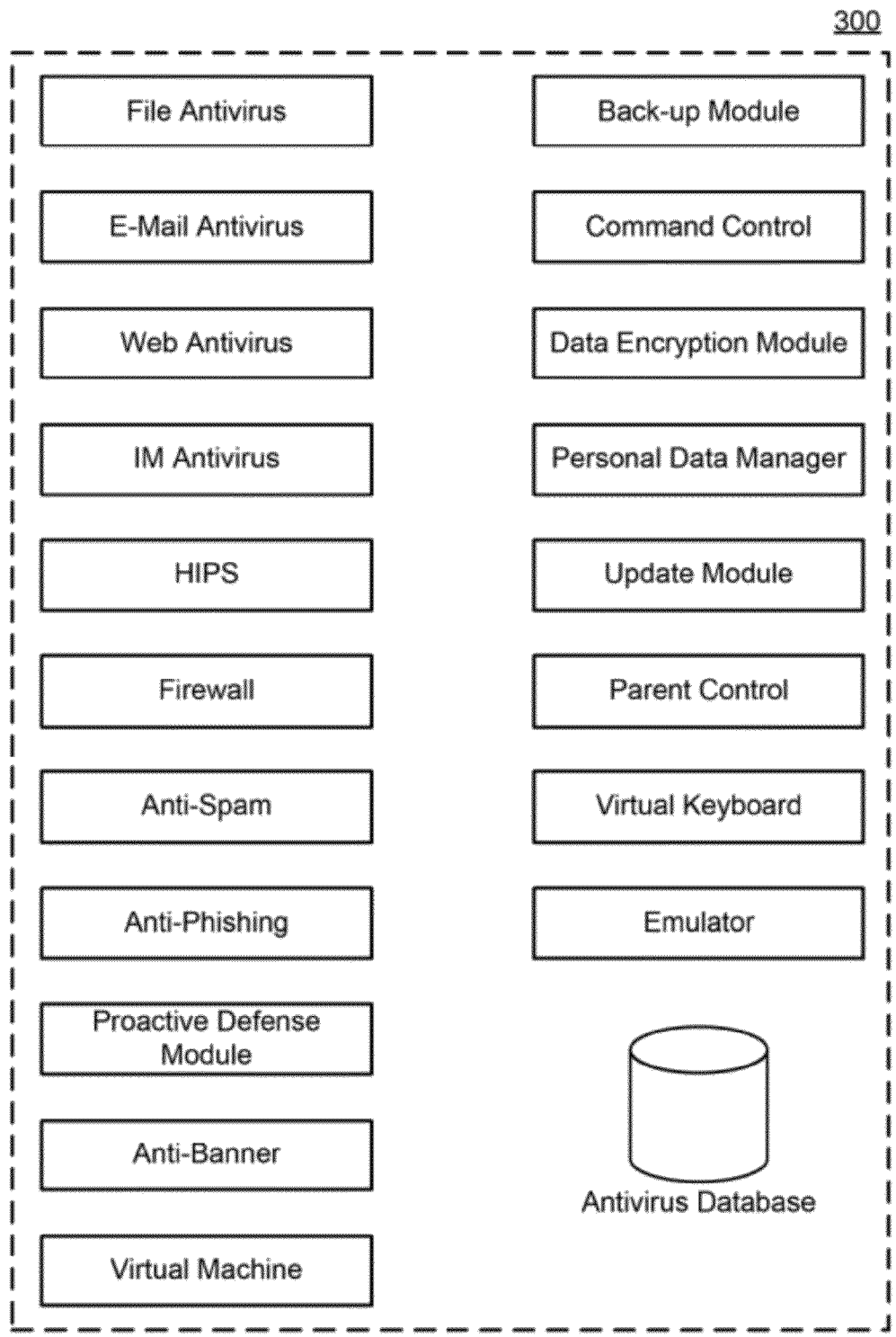
FIG. 3a illustrates a schematic diagram of antivirus software according to one example embodiment.

Each user may also be evaluated by the number of threats found in his computer after they had infected the computer and launched their harmful activity. This may be associated with the following events:

The user seldom updates antivirus databases, or the antivirus company itself cannot keep up with issuing update releases (for reason noted in descriptions for FIGS. 2 and 3);

The user frequently disables antivirus software (by closing the program);

The user has not properly set up his antivirus software.

Figure 8:
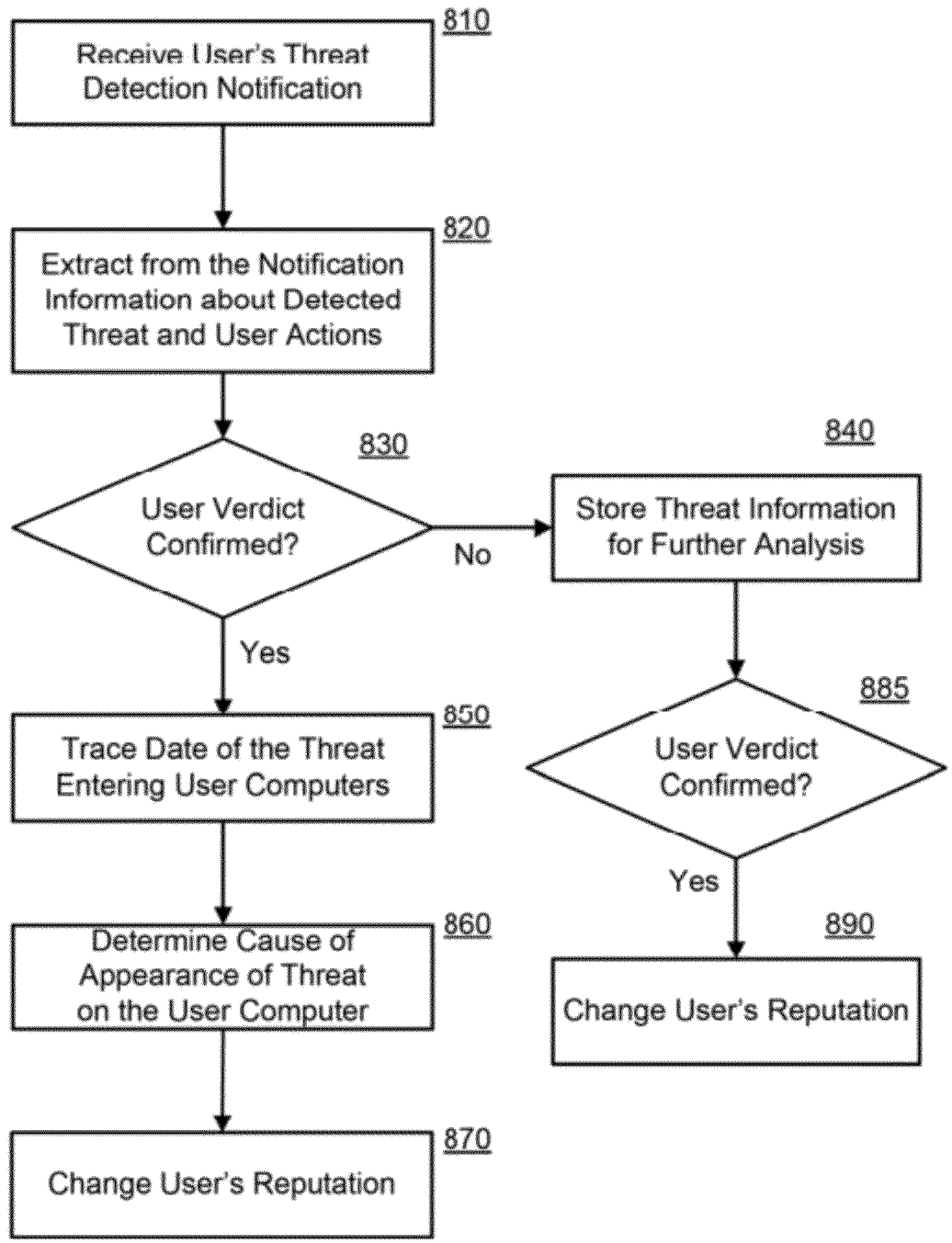
FIG. 8 illustrates a threat detection notification processing method for a threat detected in the user's computer according to one example embodiment.

FIG. 8 shows one example embodiment of a threat detection notification processing method for threats detected after they had entered the user's computer. This may include, for instance, the following:

1. Active infection phase. It means that the first check of, for example, an executable file did not find it in the malware database and its emulation did not detect any harmful activity. When such file is executed and its harmful activity has begun, the proactive defense module will be able to disable it.

2. Insufficient user activity with antivirus software. It means that the user has not properly set up or has disabled antivirus software, which led to various threats entering the user's computer.

3. Absence of regular antivirus database updates. Some antivirus software 300 modules do not guarantee a 100% detection of malware, but only report a probability that the scanned file may be harmful. The proactive defense module and virtual machine are such modules.

After receipt at step 810 of the threat detection notification, at step 820 the required information is extracted from the notification for further analysis. The required information means the threat object details (such as potentially harmful unknown file or link), and the user's actions. The threat information is then analyzed at the cloud service at step 830.

If the threat is not confirmed at step 830, but the user's actions indicate that he believed, for instance, an unknown file during its execution (opening) attempt to be malware or blocked an unknown link, such information will be saved for further analysis at step 840. If later at step 885 the user's actions are confirmed correct (i.e. the verdict was correct), that will mean that he was among the first users to detect a malware of harmful link. In this case, the user's reputation will be revised at step 890, in particular, his activity parameter based on the number of unique detected threats will be increased.

If at step 830 the threat is confirmed, then at step 850 the date of the threat entering the user's computer will be traced. This may be accomplished by analyzing the malware time stamp (i.e. its creation or modification time), activity logs maintained by a proactive defense module. Then at step 860 the causes for threat entering the computer, such as disabled antivirus software modules, incorrect antivirus software setup, irregular database updates, etc. are determined. After determination of the cause, the user's reputation is revised at step 870, in particular, the infection activity is increased.

It is worth noting that after receiving at steps 810-820 a threat detection notification and relevant information, as well as user verdict, the latter may be used for blocking such threat until the verdict is confirmed at step 830 or step 885.

Another important reputation aspect is the software interface use activity (or user's proficiency with the antivirus software). In terms of contemporary antivirus software, such as the Kaspersky Internet Security 2011 or McAfee Total Protection, such activity includes such action types as:

Setup of various software modules. An example may be installation of a manual antivirus database update feature. Setup may also be used for various modules, such as antispam module training for scanning of incoming e-mail traffic or selection of rules for parental control module.

Answering software questions in an interactive mode, tracing various software messages. An interactive mode of using antivirus software assumes that the user will perform certain operations, such as make a decision to block an unknown program (not found in the malware database or the trusted programs database), a decision to perform a complete scan of removable media, etc.

The user's time of response to software interface messages. Antivirus software operating in an interactive mode can also monitor the user's time of response to prompts (for example, waiting time for user's response regarding blocking an unknown program).

Interface nesting verification. Contemporary antivirus software, including antivirus applications, has many different settings, which may be hidden in various parts of a graphic interface. The user's actions with interface settings that are more nested suggest his interest in a more detailed study of antivirus software capabilities.

Use of non-automatic protection means or additional capabilities. Antivirus software, as a rule, is initially well setup and may operate automatically without user's participation. But such modules as a Personal Data Manager or Virtual Keyboard shall be operated by the user himself. This bespeaks of his interest in using the full spectrum of antivirus software functions.

Exit from software, its shutdown. Even though the contemporary antivirus software, as a rule, is subjected to lengthy testing with various operating systems in order to verify its compatibility with other applications, there is always a risk of false negative, when a trusted application may be determined to be harmful. As a result, antivirus software may block launch of that application or restrict access to resources (such as network resources), upsetting a user. Due to such errors and to the fact that antivirus software often "prompts" the user for this or that action (for example, in an interactive mode), some users prefer to disable antivirus software temporarily or for good. Such actions are viewed as reduction of user activity in working with the software interface.

Changes of application settings made too often, identical interface actions (checking/unchecking of the same feature several times during a short time period), etc. can be viewed as software interface activity anomalies.

Figure 9:
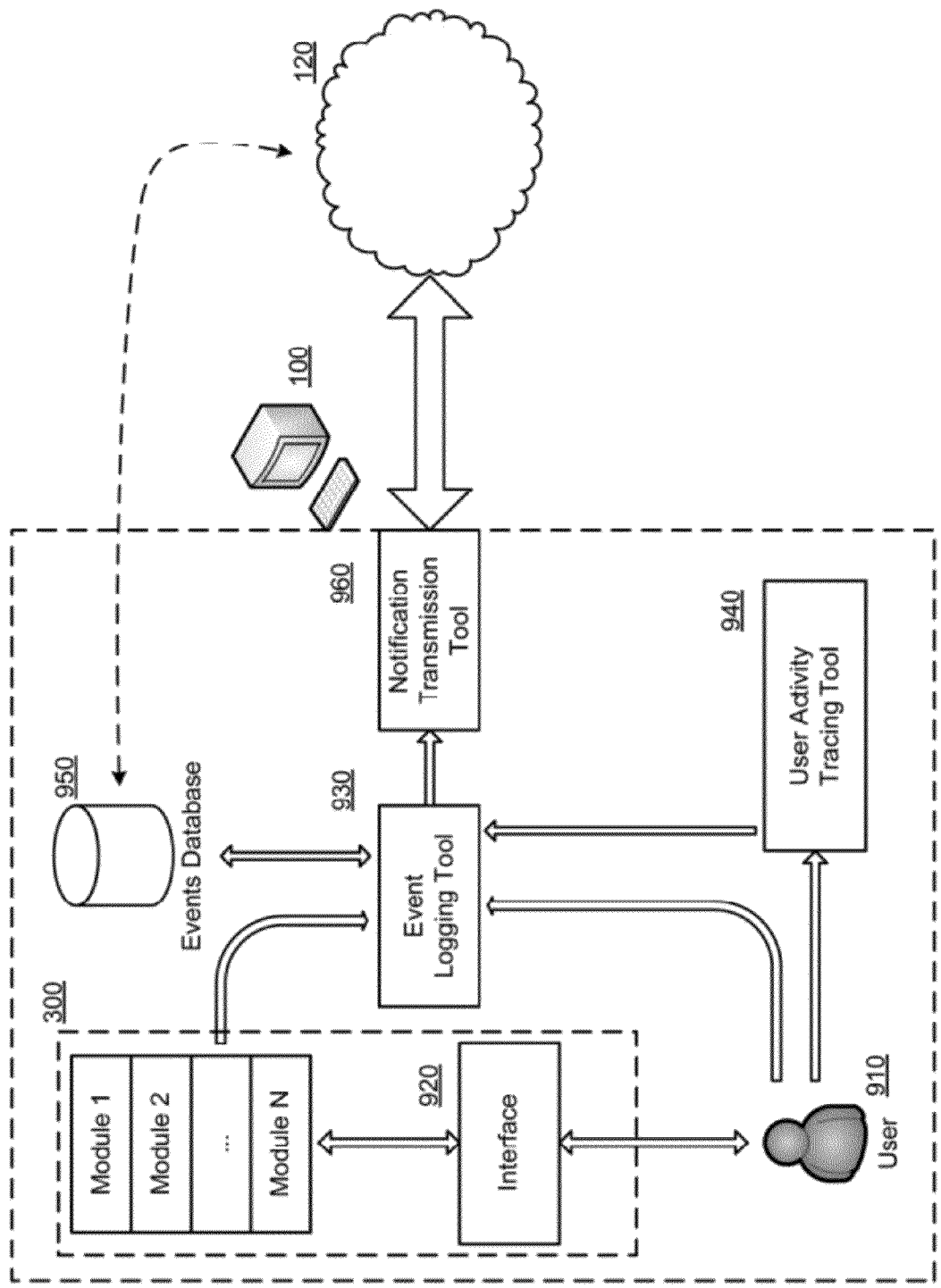
FIG. 9 illustrates a user's computer event logging system according to one example embodiment.

After review of various user activity evaluation options, it is necessary to consider the means required for logging events taking place in users' computers in accordance with their activity. FIG. 9 illustrates one example embodiment of a user's computer event logging system.

User 910 working at his PC 100 conducts operations which may be recorded by the antivirus software 300 and its modules, as well as directly when working with an antivirus software interface 920. The information about these actions is transmitted to the event logging tool 930. Tables 1 and 2 contain examples of the transmitted data types. The user activity information is also transmitted to a user activity tracing tool 940, which is used to identify the actual user of PC 100. This is done because the PC 100 may be operated (even if at different times) by several users 910 with different behaviors from the computer security standpoint.

For example, in a family both parents may understand the computer security basics (do not execute unknown files, do not follow unknown links, etc.), but a child may not know these rules. One of the simplest user determination methods is based on accounts used for computer system (or OS) access. Another option includes tracing user actions in order to determine the most typical ones: launch certain applications, opening certain type of files, typical system resources consumption level, etc. Thus a behavior of a user working mostly with text files can be differentiated from a user playing computer games. The user activity tracing tool 940, as one of embodiments, may define user's behavioral patterns based on intercepts of data from entry devices (keyboard, mouse). For instance, U.S. Patent Applications 2006/0224898 and 2004/0221171, which are incorporated by reference herein, describe a user identification idea founded on behavioral patterns based on use of mouse dynamic parameters (average cursor speed, cursor path, cursor movement distances in various directions, idle time, etc.). U.S. Patent Application 2004/0172562, which is also incorporated by reference herein, describes a system and method of user identification based on his personal text entry specifics (such as pauses between keystrokes, key press time, etc.)—so-called keyboard rhythm. Identification is based on comparison of these parameters during current password entry with a template storing the user's reference login parameters obtained during previous sessions.

An event logging tool 930 obtains the user 910 activity data, actual user indication from the user activity tracing tool 940 and data from the antivirus software 300 modules and compares these with the event patterns stored in events database 950. Such comparison is necessary for the determination of events which shall be transmitted as notifications. If the events database 950 includes an event template, then the events logging tool 930 transmits the event information to a notification transmission tool 960, which generates the notification for transmission to the cloud service 120, more exactly—to the user actions processing tool 510. The events database 950 may also be updated if certain information must be gathered on an event type or if data transmission shall be shut down for lack of informative events.

Figure 10:
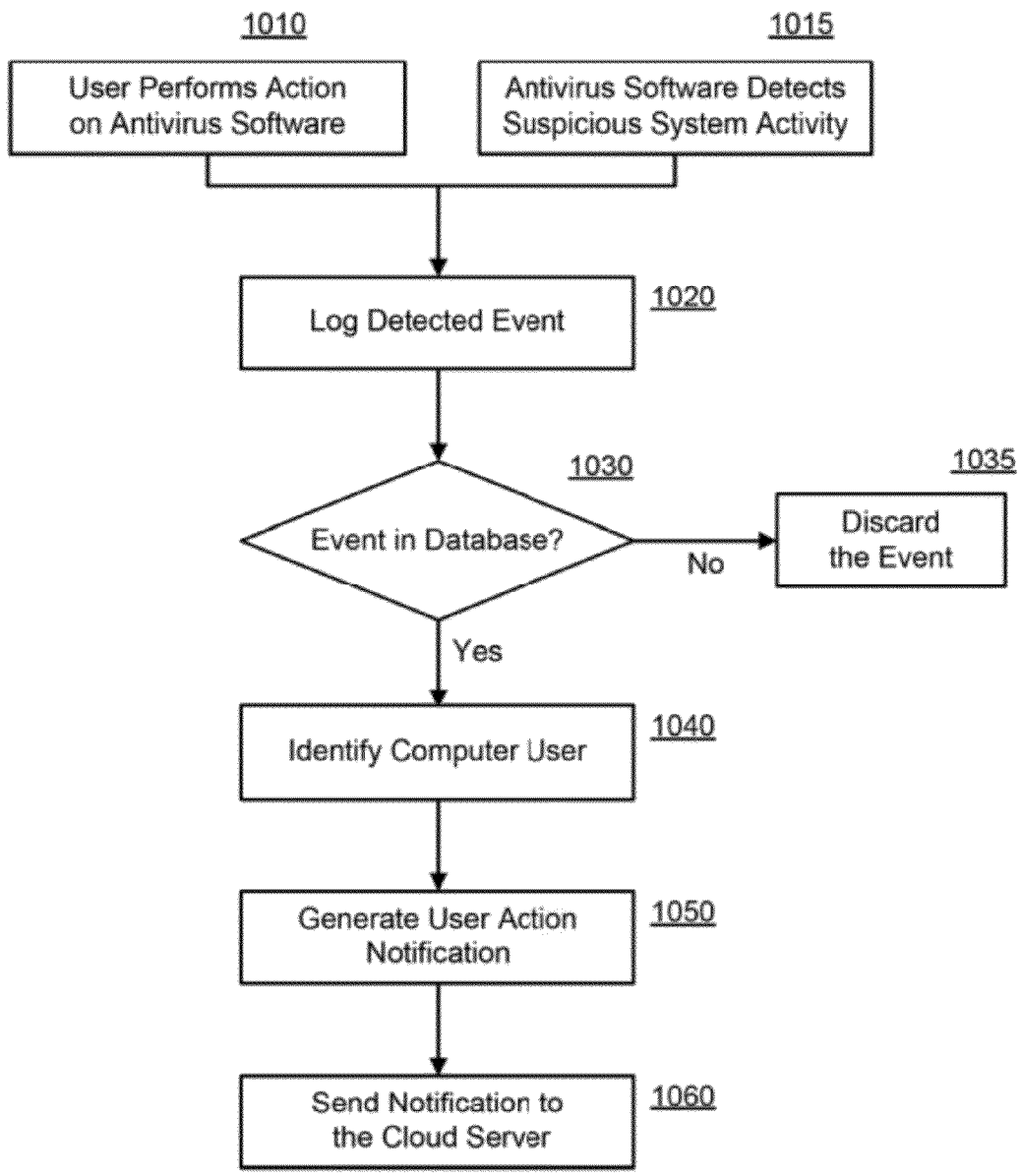
FIG. 10 illustrates a user's computer event logging method according to one example embodiment.

FIG. 10 shows a user's computer event logging method according to one example embodiment. At equivalent steps 1010 and 1015 a user may do something (for example, via interface 920), or some antivirus software 300 module may detect an event (such as an attempt to execute an unknown file). Then at step 1020 the event is logged in the system by transmitting the required data to the events logging tool 930, which at step 1030 checks the events database 950 templates for a similar event. If the event was not found in the events database 950, it is discarded at step 1035. In another embodiment, the event information may be stored for future use when such event starts playing a role in computer security. Otherwise, at step 1040 the actual user is determined using the user activity tracing tool 940. Then at step 1050 a notification is generated by the notification transmission tool 960, which at step 1060 transmits the notification to the cloud service 120. One of the embodiments also includes the use of a similar actions repeat counter with a notification pack transmission at step 1060, saving on traffic and resources in case of high event frequency at the user side.

After reviewing the user's computer events transmission to the cloud service in the form of notifications, with their subsequent analysis and determination of user reputation, we can determine how to use the obtained reputation for the generation of roles. A role is some abstract description of a user based primarily on his actions, including verified verdicts (and, as the consequence—reputation and activities) associated with computer security. A role is based not only on the presentation of a user reputation-based characteristic, but also includes the following parameters:

Reputation and all the activities used to form such reputation;
Anomalies associated with reputation activities;
Information on the used antivirus software. Such information includes license data (such as commercial software or freeware);
Information about the user's computer, its capabilities (resources) and their use.

Figure 11:
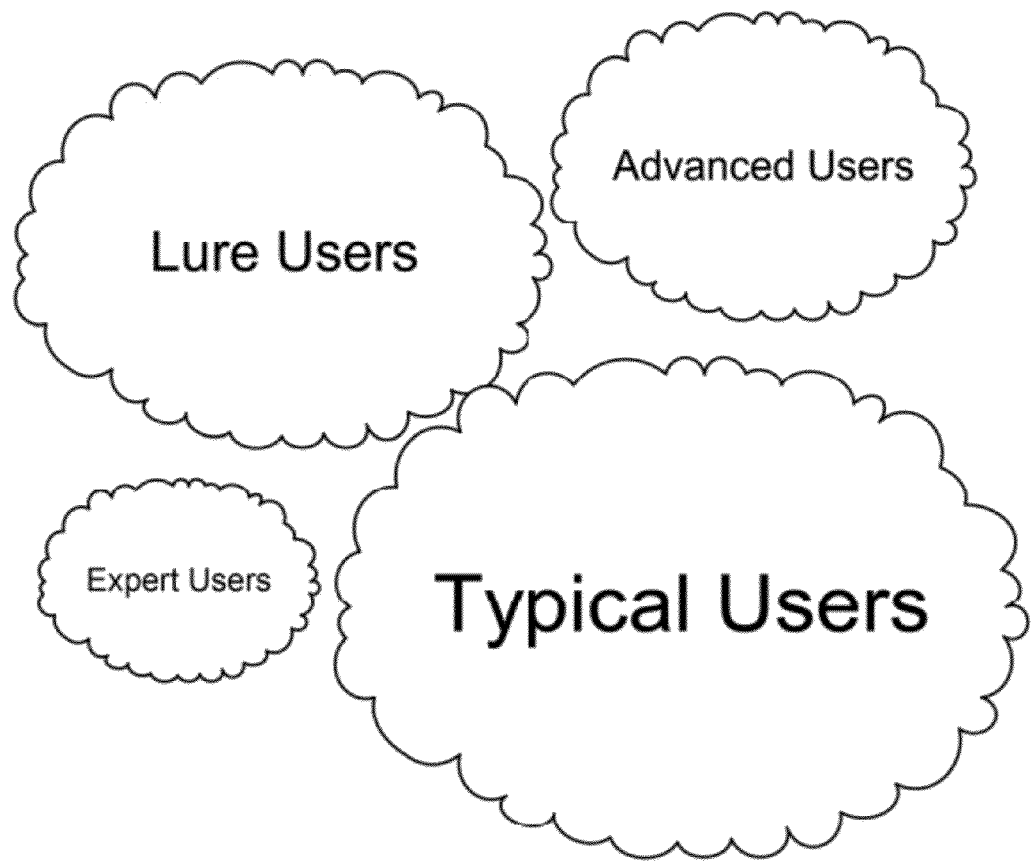
FIG. 11 illustrates a sample role-based classification of the cloud service users according to one example embodiment.

FIG. 11 shows a classification of the cloud service 120 users based on their roles according to one example embodiment. The entire user set can be broken into communities, with every community comprising users with substantially similar level of expertise in the field of computer security. It is worth noting that the classification shown in FIG. 11 is only an example illustration in order to facilitate understanding. The diagram shows the following role communities: "regular users", "experienced users", "experts" and "lure users". This list is only an example and may be expanded. A detailed description of sample roles is shown in FIG. 12.

"Regular users" are users with reputation containing a low quantity of detected threats, low uniqueness of detected threats, low interface activity, low infection activity. Such users, as a rule, are not confident computer users and often do not ever check their antivirus software operation. One of the embodiments automatically assigns this role to all new users. Therefore, regular users are the users with generally low level of expertise in the field of computer security. As such, the verdicts of regular users 100 with respect to maliciousness or cleanness of an unknown security threats detected on the user computer by the user 100 may be are verified by the user actions verification tool 540 of the cloud service 120 according to one example embodiment.

"Experienced users" are users with reputation containing low or average quantity of detected threats, average uniqueness of detected threats, average interface activity, low or average infection activity. Such users are sufficiently experienced to understand the danger of executing an unknown program. They also understand the basic precautions when working with important and personal data. Nevertheless, the increased infection activity is directly associated with the users' activity, for example, when working in the Internet. Therefore, experiences users are the users with generally higher level of expertise in the field of computer security then regular users. As such, the verdicts of experienced users 100 with respect to maliciousness or cleanness of an unknown security threats detected on the user computer by the user 100 may be also verified by the user actions verification tool 540 of the cloud service 120 according to one example embodiment.

"Experts"—usually, there are not many of them, but they have an average quantity of detected threats, average or high uniqueness of detected threats, and exhibit high antivirus software interface activity. Since they are often the "discoverers" of new unknown threats, their feedback and opinions (decisions) are of utmost importance. Therefore, expert users are the users with generally higher level of expertise in the field of computer security then experienced users and much higher level of expertise then typical users. As such, the verdicts of expert users 100 with respect to maliciousness or cleanness of an unknown security threat detected on the user computer by the user 100 may be accepted by the user action processing tool 510 of cloud service 120 without verification by the user actions verification tool 540 or at least without immediate verification according to one example embodiment.

"Lure users" are users with high quantity of detected threats, usually of low or average uniqueness. Such users seldom set up the antivirus software 300, or disable many necessary modules altogether, which means low interface activity. As a consequence, they have high infection activity. Such users often spend many hours surfing the Internet, download and execute new software, but often do not understand that a Trojan virus may be hidden in a new set of video encoder/decoder modules. Therefore, lure users are the users with even lower level of expertise in the field of computer security then regular users. As such, the verdicts of lure users 100 with respect to maliciousness or cleanness of an unknown security threats detected on the user computer by the user 100 should be also verified by the user actions verification tool 540 of the cloud service 120 according to one example embodiment.

Even though FIG. 11 shows only approximate user classification by role based on the user's level of expertise in the field of computer security, most often there are fewer expert users than representatives of other roles, but actions of these users are of the most interest to an antivirus company. A role weight notion is introduced in order to account for the importance of users with a more significant role. The role weight may be set empirically or automatically controlled, as users in different roles make their decisions. In one of the embodiments, the weight can be determined based on several parameters: antivirus software installation type (normal or expanded), OS version, software installed in the user's computer, hardware set, etc.

In one example embodiment, the weight can be changed dynamically—for example, as the number of sales of the antivirus applications 300 grows and results in the increase in the number of typical users, so is the weight of the role of expert users should also grow.

The table below shows estimated weights of various roles:

TABLE 5

| Role | Role Weight |
| --- | --- |
| Regular user | 1 |
| Advanced user | 10 |
| Expert | 500 |

Thus, an opinion of a user in the "expert" role in a decision to block or allow execution of the same unknown program is equivalent to opinions of 500 users in the "regular user" role. This approach makes it possible to "outbalance" actions of a large number of inexperienced users who encounter unknown malware and make a lot of errors. Another embodiment includes taking into account only opinions of users with a certain role, such as "expert". In this embodiment, it is critically important to determine the users in such role at the initial phase in order to use their expertise.

Figure 11A:
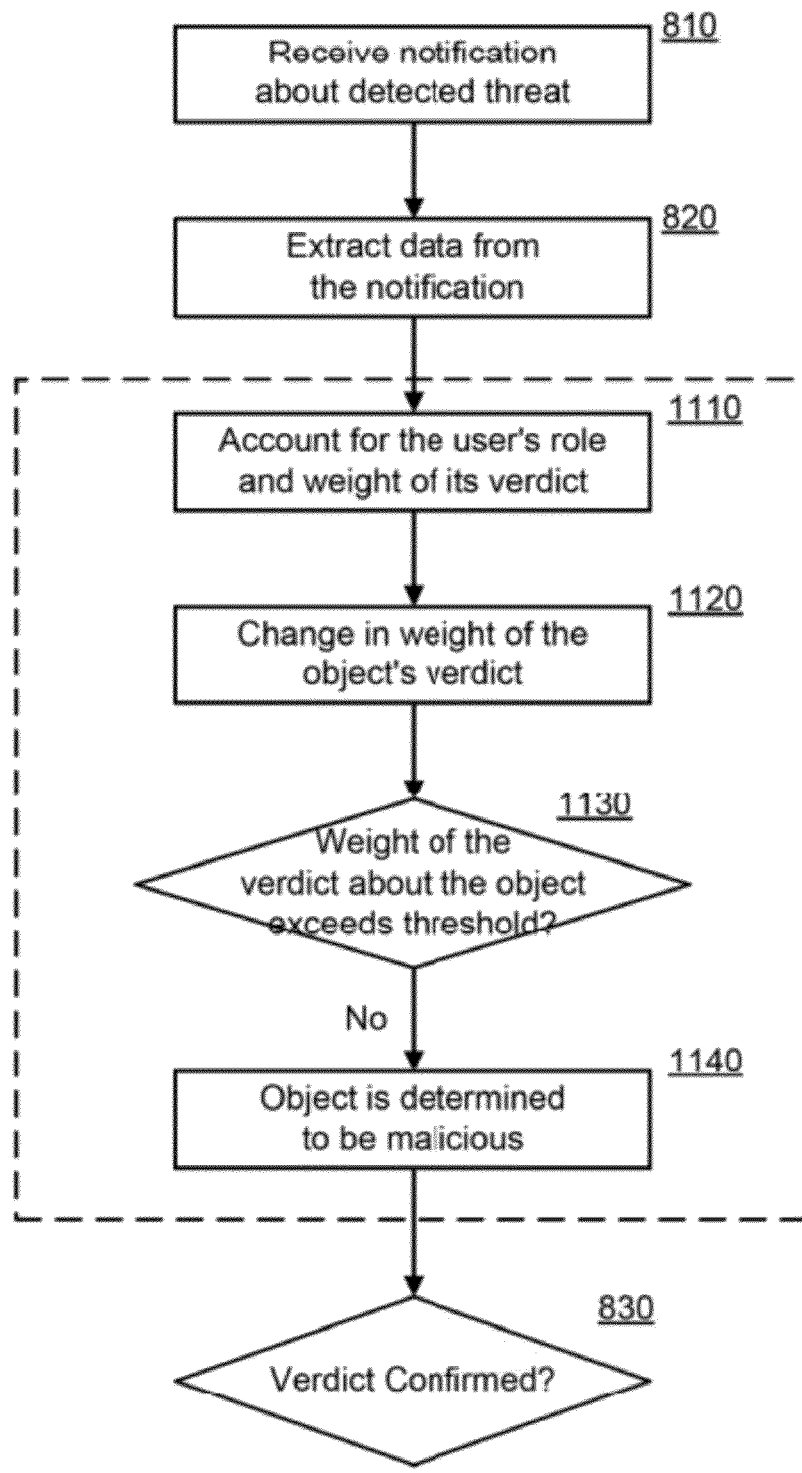
FIG. 11a illustrates a method for user role weight determination according to one example embodiment.

FIG. 11a shows a method of accounting for user's role weight in verdicts for the purpose of unknown computer threat detection according to one example embodiment. After step 820 from the FIG. 8, the user's weight and verdict are accounted at step 1110 in order to revise at step 1120 the weight of the verdict for the threat object (data file or link). In one of the embodiments, the verdict weight may increase by a certain amount if the user had considered an event associated with a threat object to be harmful and blocked it (for example, blocked launch of an executable file). In another embodiment, the verdict weight may increase by a value proportional to the user's role weight, which allows for primary consideration of users with a certain role. In yet another embodiment, the verdict weight may also decrease if the user considered an event associated with a threat object to be safe and allowed it. At step 1130, a check is performed to find out if the verdict weight has exceeded the set threshold, and if it has, at step 1140 the object is declared harmful from the users' standpoint. This is followed by step 830 from the FIG. 8. The threshold set at step 1130 may be determined empirically based on users' verdicts or using statistical methods to analyze verdicts received from users in various roles during a certain time period according to one example embodiment.

Each role may also have additional subdivisions associated, for example, with anomalies. Taking anomalies into account allows for monitoring such events as:

Emergence of unknown malware (may affect detection of unknown threats and their uniqueness);
Use of cloud service resources with malicious intent; forging of notifications;
Use of bot programs and other activity increase methods in order to obtain desired reputation.

For example, accounting for anomalies in the "regular user" role interface activity looks as follows:

TABLE 6

| Quantity of anomalies | Possible cause |
| --- | --- |
| None | Work of regular user |
| Few | Regular user learns an interface, higher activity is noted |

TABLE 6-continued

| Quantity of anomalies | Possible cause |
| --- | --- |
| Many | Bot programs are used to work with software interface; very high interface activity |

Figure 13:
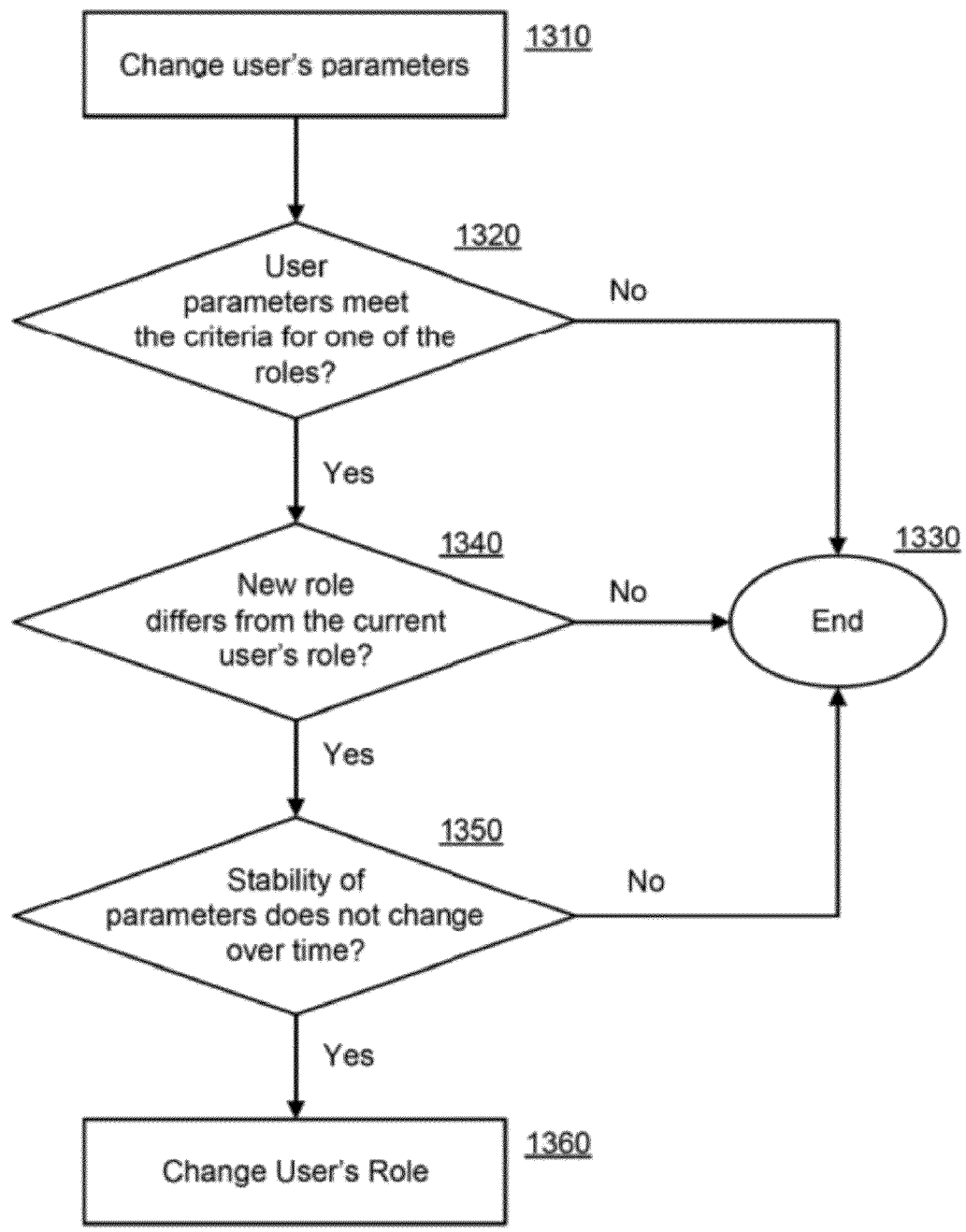
FIG. 13 illustrates a user role assignment method depending on reputation and other parameters according to one example embodiment.

FIG. 13 illustrates one example embodiment of a user role assignment method depending on reputation and other parameters. At step 1310, any changes in user parameters are recorded, such as a change in the activity from "low" to "average" based on the number of detected threats. At step 1320, a check is performed to establish whether the user parameters satisfy criteria of one of the roles. An example of such verification is shown below:

IF
<detected threats quantity>="average"
<detected threats uniqueness>="low"
<interface activity>="average"
<infection activity>="average"
THEN
<user role>="experienced user"

If the parameters do not satisfy any of the currently available roles, then the method ends at step 1330. Otherwise, at step 1340, a check is performed to find out if the role based on parameters differs from the one currently assigned to that user. This is due to the fact that some roles have value variations for user parameters; for example, the "expert" role has both the "average" and "high" values for the detected threat uniqueness. If the role is different from the current role, then at step 1350 check of stability of user's parameters over time (such as a month) check is performed. If the user parameters satisfy the required role during the set time period, then at step 1360 the user role is revised.

Figure 14:
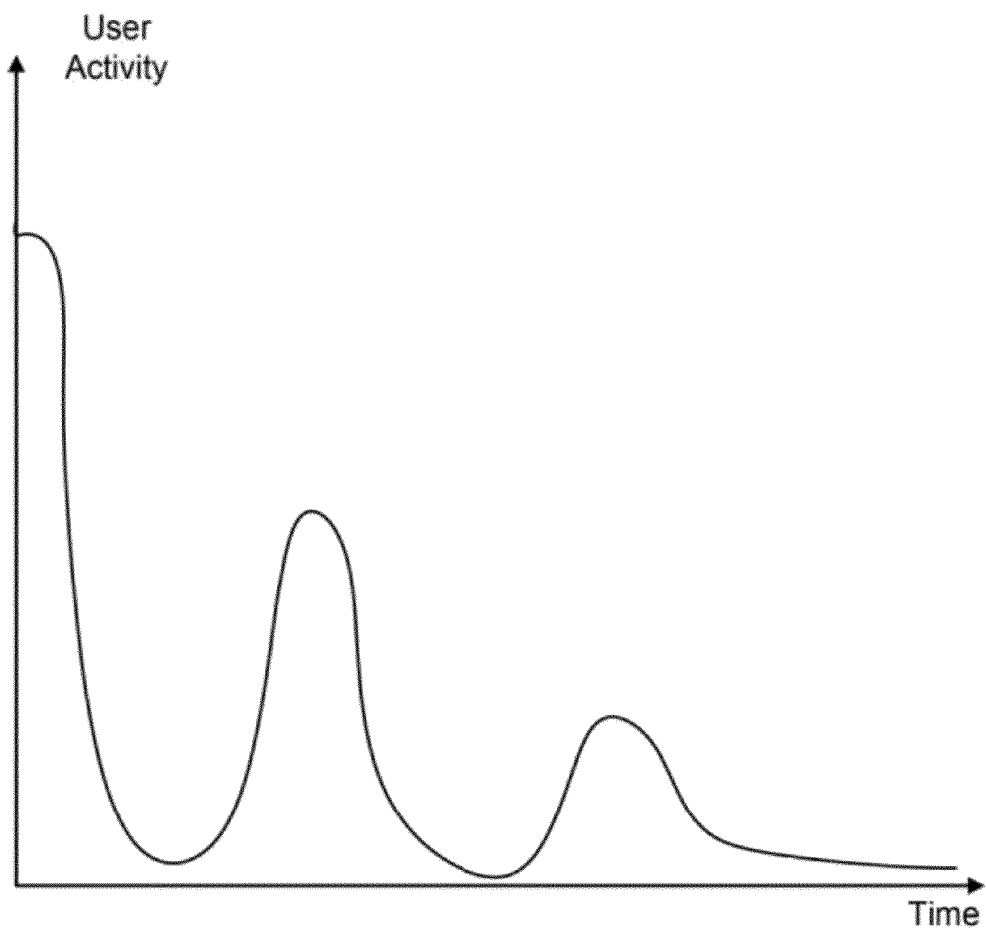
FIG. 14 illustrates a graph of estimated variation of the quantity of detected threats with time according to one example embodiment.

It was mentioned at step 1350 that a check is performed of the user parameters stability over a set time period. Such check is necessary in order to continuously evaluate the user parameters which may not retain their constant values with time. Such an example is shown in FIG. 14, which shows estimated variation of detected threat quantities with time. After antivirus software 300 installation (time line start), a large volume of malware was detected in the computer (for example, during a full scan of the entire hard drive), and the detected threats activity was high. After most of the malware is deleted, the new activity increases over time may be associated with various factors, such as: the user may be infected with an unknown malware, antivirus databases had not been updated for a long time period or the user had not launched the necessary virus scans, etc. Eventually the user stops encountering large volumes of malware in his computer, which may also be associated with a number of factors. For one, the user had learned computer security basics (ceased to follow suspicious links on the Internet), improved his antivirus software setup, reduced his computer activity, etc. All that reduced the detected threats activity to a low level. Therefore, one of the example embodiments allows revising the user reputation-forming activities with time.

Depending on the role, each user is assigned different capabilities, some of which are listed below (the list is an example and may be expanded):

Selection of collected data set, including for notifications;
Changes in antivirus software interface capabilities;
Changes in recommended antivirus software module settings;
Changes in network resources (e.g., bandwidth) allocated for receiving data;

Changes in server processing resources (e.g., CPU time) allocated to received data;

Performance of computer security-associated tasks.

Selection of collected data set. Antivirus companies are interested in obtaining in notifications the most important data, which primarily means data on unknown (unique) malware and in minimization of transmitted data volumes upon detection of already known threats. The roles allow pinpointing the users from which a larger amount of data may be received on unique threats. As an example, within the context of this invention it may be the "expert" role users.

For instance, during a launch of an unknown file on a computer, to collect data from a user assigned the "regular user" role, the following data will be included in the notification:

MD5 file sum

Digital signature, if any

Optional: command line attributes, file attributes

At the same time, a notification transmitted by the "expert" role user will include a larger data set (hereinafter collected data are related to the Windows OS family):

MD5 file sum

Digital signature, if any

Optional: command line attributes, file attributes

DLL libraries information, their description, which computers

Kernel objects data. Their size, description, source

Services information. Status (running/stopped/autorun available), description

Driver data. Status (running or not), file, group

File hosts, etc.

Another example may be associated with emulator use. During an unknown file emulation the following data will be included in the notification from a user assigned the "regular user" role:

MD5 file sum

Brief summary of emulator operation: number of instructions, received Security Rating, which are described in U.S. Pat. No. 7,530,106, which is incorporated by reference herein.

On the other hand, when an emulator is used for the same file from an "expert" role user, the notification will include a larger data set:

MD5 file sum

Brief summary of emulator operation: number of instructions, received Security Rating Set limitations for emulator operation (limits on operating time, memory size, central processor instructions)

Memory dumps (i.e. data obtained from memory during emulation)

Figure 15:
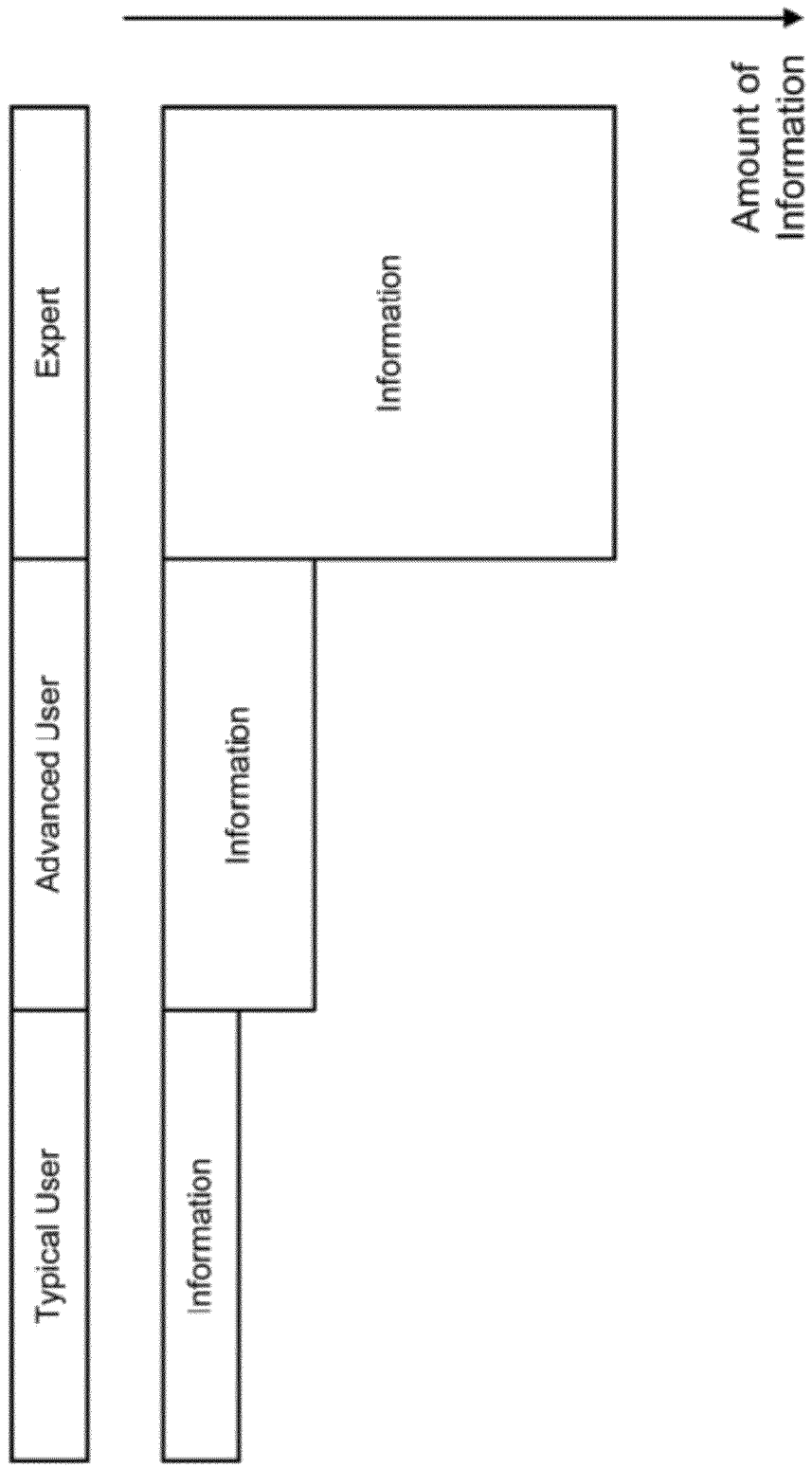
FIG. 15 illustrates a distribution of the user transmitted data volumes depending on their roles according to one example embodiment.

It is evident that the data sent by "expert" role users differ in quality and quantity. FIG. 15 shows an example distribution of the user transmitted data volumes depending on their roles. One can see that the users which are able to submit more additional and important data (and in this case these are the "expert" role users) may need a separate communication link with the cloud service 120 (such as an established highest priority link), since in this case the importance and scope of data received from such users play an important role.

In another example embodiment, users with different roles have different antivirus software interface capabilities. For example, user interface settings of the software application for a user with higher level of expertise in the field of computer security, e.g., expert user, may provide greater level of control over operation of the antivirus application and its various modules than user interface settings for a user with lower level of expertise in the field of computer security, e.g., typical user. For example, an expert user may be allowed to configure the emulator module (e.g., limits on operating time, memory size, and central processor instructions) or other analytical modules of the antivirus application.

Figure 16:
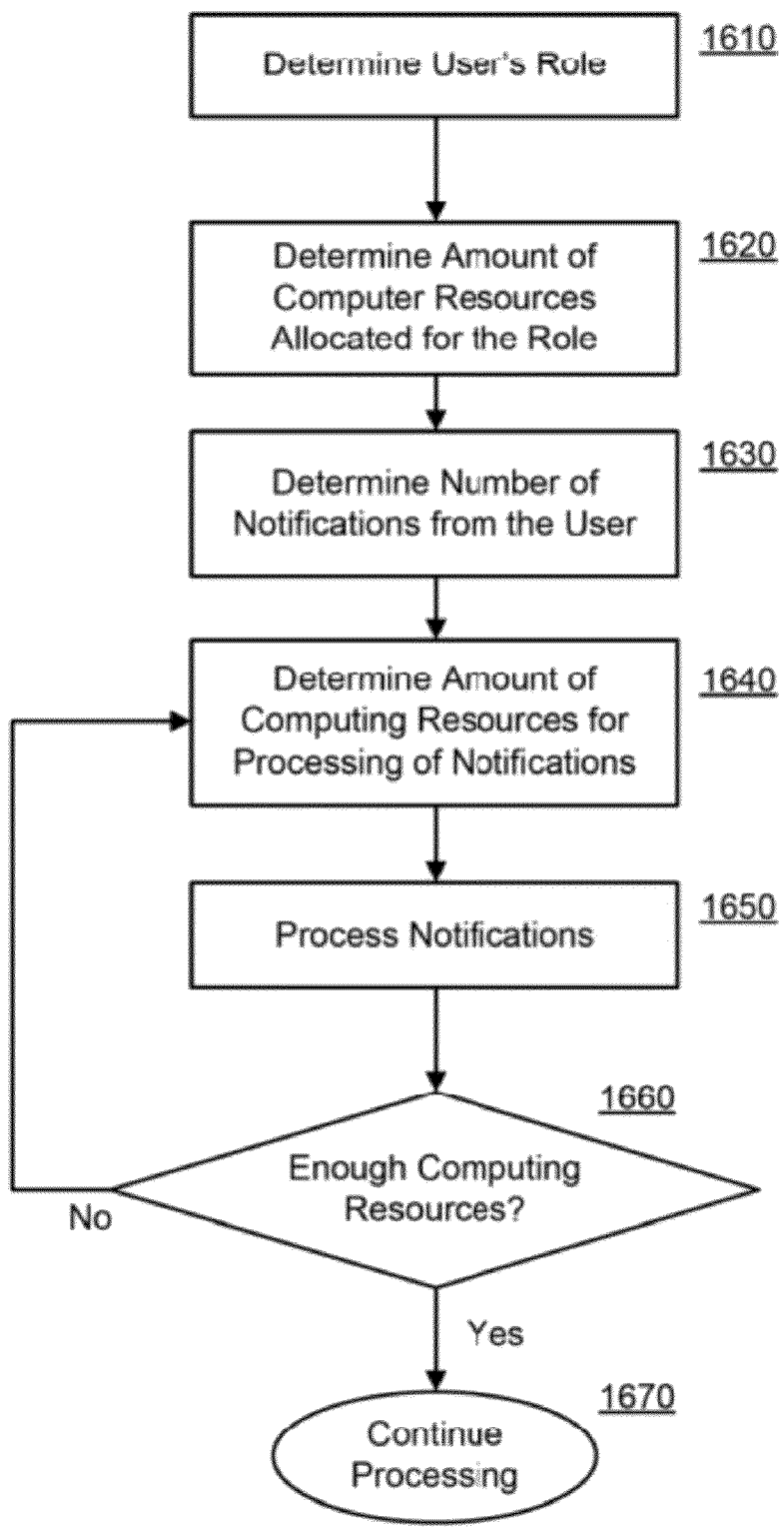
FIG. 16 illustrates a cloud service computing resource allocation method for processing of notifications from a specific user according to one example embodiment.

FIG. 16 illustrates a cloud service 120 computing resource allocation method for processing notifications from a specific user according one example embodiment. The user's role is determined at step 1610 and then the computing resources, which can be allocated for this role, are determined at step 1620. In this case the computing resources include, but not limited to: central processor time, memory size, maximum data volume which can be saved on the drive, network link capacity (quality of service). Since all these resources are associated with an actual computer within the cloud service 120, which is allocated for processing of notifications received from the user, various priority assignment schemes for higher-priority processing of notifications from users with a more significant role (in this case—"expert" role users) are additionally employed according to various embodiments of the invention.

Let's review an example of prioritizing a user's network link quality of service. For example, on the Ethernet frame level (second level of the OSI model) there is a TAG field enabling feature, the value of this field denoting the required level of service. Since the IP protocol is valid not only for the Ethernet, but also for WAN which are not necessarily based on the Ethernet frame, an IP-packet also has a special ToS field receiving the required level of service data. Later a new Differentiated Services (DS or DiffServ) protocol was developed, which is currently used to mark IP-packets in accordance with the level of service.

Small and medium company switches, as well as access level switches in large networks usually employ only the Ethernet frame QoS field for prioritization. Company level switches can prioritize the traffic taking into account all the current standards. Data packets have a special 802.1p protocol three-bit priority field allowing marking local network data with one of eight classes of service.

Another prioritization example may be described as follows:

For users assigned the "regular user" role, the cloud service may allocate a server with the following configuration:

Processor: Xeon 5130

Memory: 4 GB RAM

Hard disk capacity allocated: 74 GB SCSI HDD

Connection protocol type: UDP

For "expert" role users, the cloud service may allocate a server with the following configuration:

Processor: 2xXeon 5620

Memory: 24 GB RAM

Hard disk capacity allocated: 600 GB SCSI HDD

Connection protocol type: TCP

It is evident that the server allocated for the "expert" role users has a significantly higher capacity than the one for the "regular user" role users. As was explained above, this is due to the fact that volume and importance of data received from the "expert" role users is significantly higher, since they, for one, show higher detected threat uniqueness activity.

After the computing resources for this user's role are allocated, the number of notifications (i.e. data volume) received from the user is additionally determined at step 1630. Such information may be stored in the users' reputation database 530. This is necessary for processing not only the data received from the priority role users ("expert" role), but also from users with other roles exhibiting a large file handling activity, network activity, etc.

At step 1640 computing resources required for processing of the current stream of notifications from a given user are determined based on the information obtained at step 1630. Then, at step 1650, the user's notifications received within a set time frame (a week or a month) is processed using the allocated computing resources, and then, at step 1660, a new evaluation of computing resources sufficiency for notification processing is performed. If resources are insufficient, the sequence returns back to step 1640 for a new determination of computing resources required for processing of the current stream of notifications from that user, or otherwise the sequence proceeds to step 1670 at the current computing resources level.

As shown above, a role is based not only on the reputation-based user's characteristic, but also includes the following parameters:

Reputation

Anomalies associated with reputation activities

Current antivirus software data including license (such as commercial software or freeware)

Information about the user's computer, its resources and their use.

Up to this moment, only the user's reputation and its associated anomalies were considered. Current antivirus software data and information about the user's computer and its resources may be used for determination of potential computer security tasks which can be performed on the user's computer.

Protection of cloud service and its users.

The following tasks shall be accomplished in order to provide for reliable and safe data exchange (and storage) between the cloud service 120 and its users:

Provisions for user privacy and data leak prevention.

Protection of data transmission links between the cloud service and its users.

Cloud service protection from illegal use and malicious overloading.

User privacy (personal data security) may be provided by splitting data which can be processed by antivirus software 300 modules. It is worth noting that many malware detection modules output only some standard data set (for example, indication of triggered API functions), whereas the classic signature verification uses hashing functions, which are irreversible and cannot be restored from the hash sums obtained from the same files. The following steps may be additionally used for personal data security:

Antivirus software module setup for the purpose of preventing restoration of personal data after their processing by such modules;

Designation of data domains in computer (such as some user folders) which shall be scanned by only a few antivirus software modules or not scanned at all.

Figure 17:
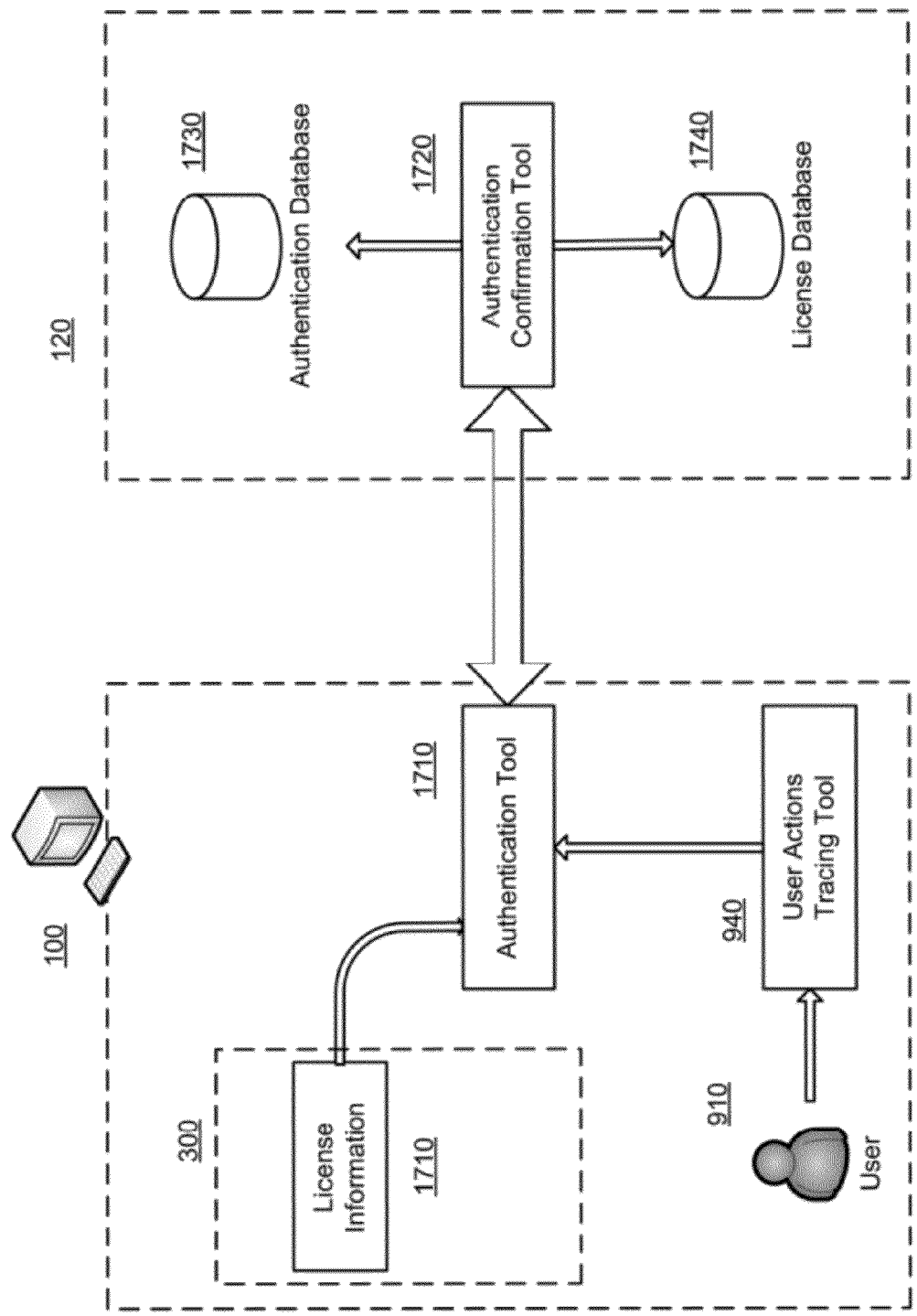
FIG. 17 illustrates a user verification mechanism for cloud service protection from illegal use according to one example embodiment.

FIG. 17 shows one example embodiment of a user authentication mechanism for cloud service protection from illegal use. A authentication tool 1710 which takes into account at least two parameters: license 1710 information (more exactly, its ID) and the information from the user actions tracking tool 940 is used for authentication of the user 910 working at the computer 100. As noted earlier, the user actions tracking tool 940 tracks the user behavior model based on his actions (say, his work with antivirus software 300). A wider set of the user actions tracking tool 940 functions may include tracking of the user biometric data: finger and hand prints, signature, iris imprint, input device (aforementioned keyboard and mouse) operating style. The user identifier obtained by the user actions tracking tool 940 is then transmitted to the authentication tool 1710, which enables an accurate identification of the user. In this case, the user identifier means not a single unique number but some set of numbers determined by the user's actions (described above in the activities determination description).

The obtained pair of identifiers—of the user and antivirus software—is transmitted by the authentication tool 1710 via encrypted link to an identification confirmation tool 1720 located at the cloud service 120. Tool 1720 compares the received data with an authentication database 1730 and license database 1740, where users and issued/sold license identifiers are stored. Thus, the user 910 antivirus software 300 interface with the cloud service takes place only after matching both identifiers. One needs to note here the possibility to shut down the cloud service 120 interface with the users characterized by a large volume of anomalies. There is also a possibility of using one license 1710 for several computer users by differentiated processing of various users' actions by the user actions tracking tool 940.

Figure 18:
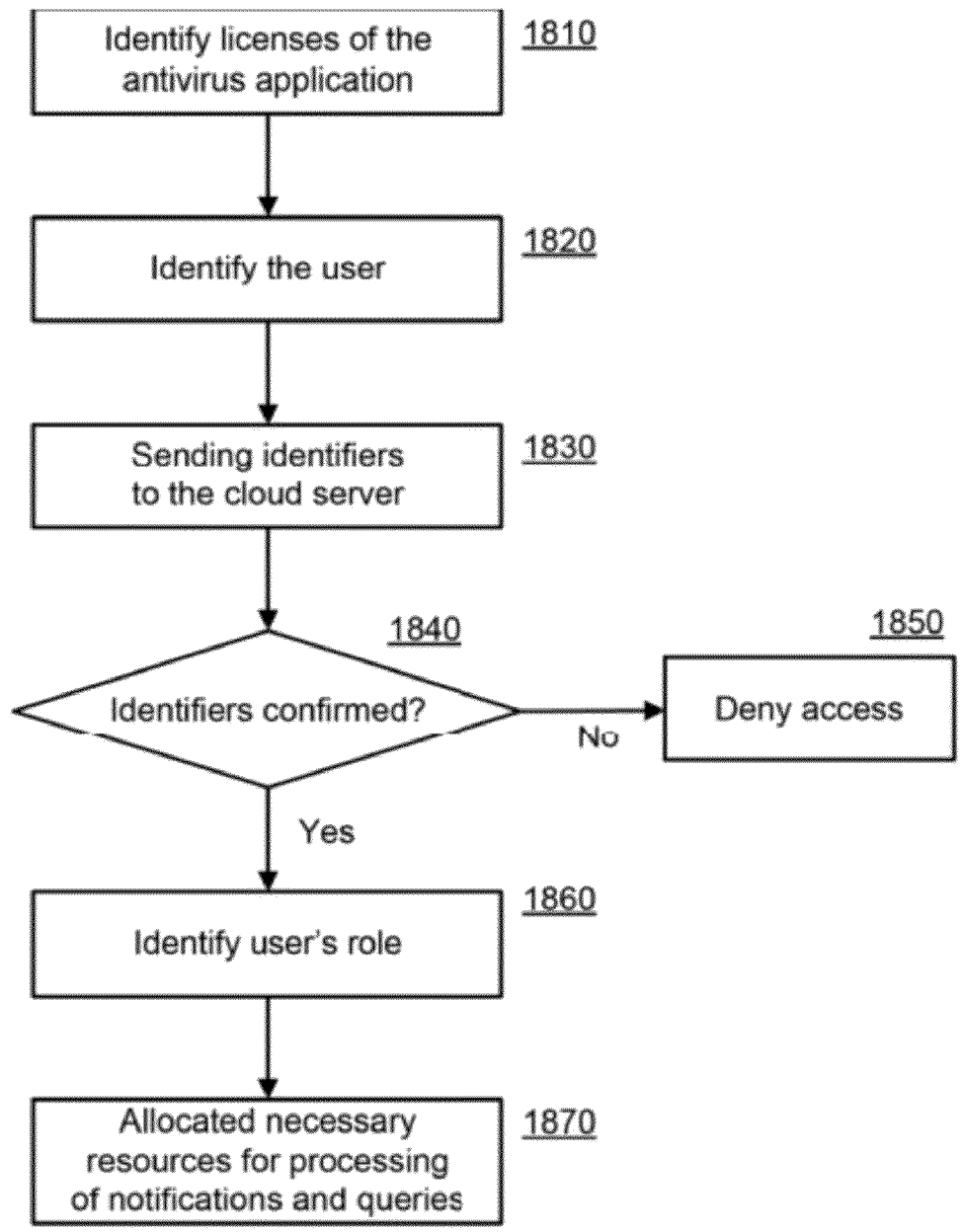
FIG. 18 illustrates a method of cloud service user identification and allocation of certain resources to the user according to one example embodiment.

FIG. 18 illustrates one example embodiment of a method of cloud service user authentication and allocation to him of certain resources. The antivirus software 300 license identifier is determined at step 1810 using the license 1710 information. Then at step 1820, the user identifier is determined by the user actions tracking tool 940. The obtained identifiers are transmitted at step 1830 to the cloud service 120, where they are verified at step 1840. If the pair of identifiers does not match the pair of identifiers retrieved from the verification database 1730 and the license database 1740, then at step 1850 the user 910 access to the cloud service 120 will be prevented and the inquiries from his antivirus software 300 will not be processed. If the pair of identifiers is confirmed, the user 910 role will be determined at step 1860 and at step 1870 the necessary resources for the role assigned to the user 910 will be allocated.

Figure 19:
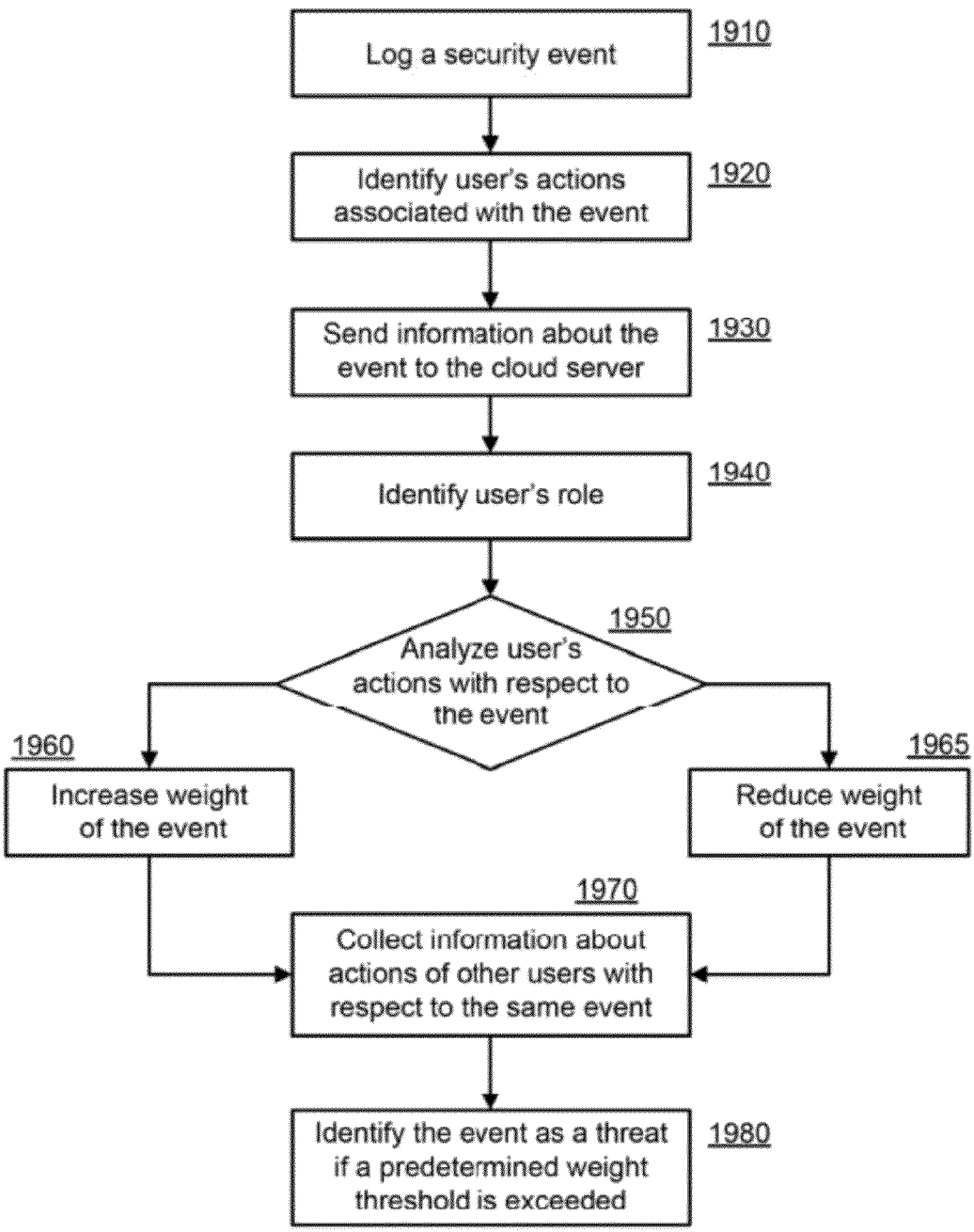
FIG. 19 illustrates a method for detecting computer security threats based on verdicts of computer users according to one example embodiment.

FIG. 19 shows a method for detecting computer security threats based on verdicts of computer users according to one example embodiment. At step 1910, a computer security related event on the user's computer is logged, such an event may be an attempt to launch an unknown program or follow an unknown link. Then at step 1920, the user's action at his computer associated with the logged event is determined. Such action may be blocking or permission of the logged event. Then, at step 1930, the logged event and the associated user's actions data are transmitted to the cloud service where the user role is determined at step 1940. At the next step 1950, the logged event weight is increased at the cloud service by the user's role weight if the logged event was blocked by the user or the logged event weight is reduced at the cloud service by the user's role weight if the logged event was permitted by the user. For example, if a user in the "regular user" role blocked execution of an unknown file, his weight from, for example, Table 5 will increase the logged event weight by 1 (step 1960), but if execution was permitted by the "expert" role user with weight 500, then the logged event weight will be reduced by 500 (step 1965). It should be understood that the described scheme may use other logged event resulting weight calculation methods. Also, in one of the embodiments, not only single events but the entire strings of events are taken into account, such as an unknown file downloading and attempt to launch it. The logged event weight updating continues at step 1970 if such an event was encountered by other users. If the set weight threshold is exceeded, then at step 1980 the event will be determined as associated with an unknown threat. For example, an event associated with an unknown file execution will associate this file with an unknown malware. Use of the users' role weights allows to level a large number of users with common roles (such as the "regular user"), which may make a mistake in determining a new threat, while taking into account influence of the users with an advanced role such as the "expert". As an example, at the set weight threshold of 1000 nominal units, it will be sufficient to have 2 opinions of the "expert" role users or 1000 opinions of the "regular user" roles for designating an unknown software as malware. A situation is possible when users with the "regular user" role have made more mistakes, but a sufficient number of opinions from users with the "advanced user" and the "expert" roles will still allow to designate an unknown software as malware, notwithstanding the fact that it may use the latest developments in malware creation (users are most commonly confused by Trojan programs). In another embodiment, an event may be determined as not associated with an unknown threat if the logged event weight becomes lower than the second set weight threshold (for example, the weight becomes lower than −1000).

Figure 20:
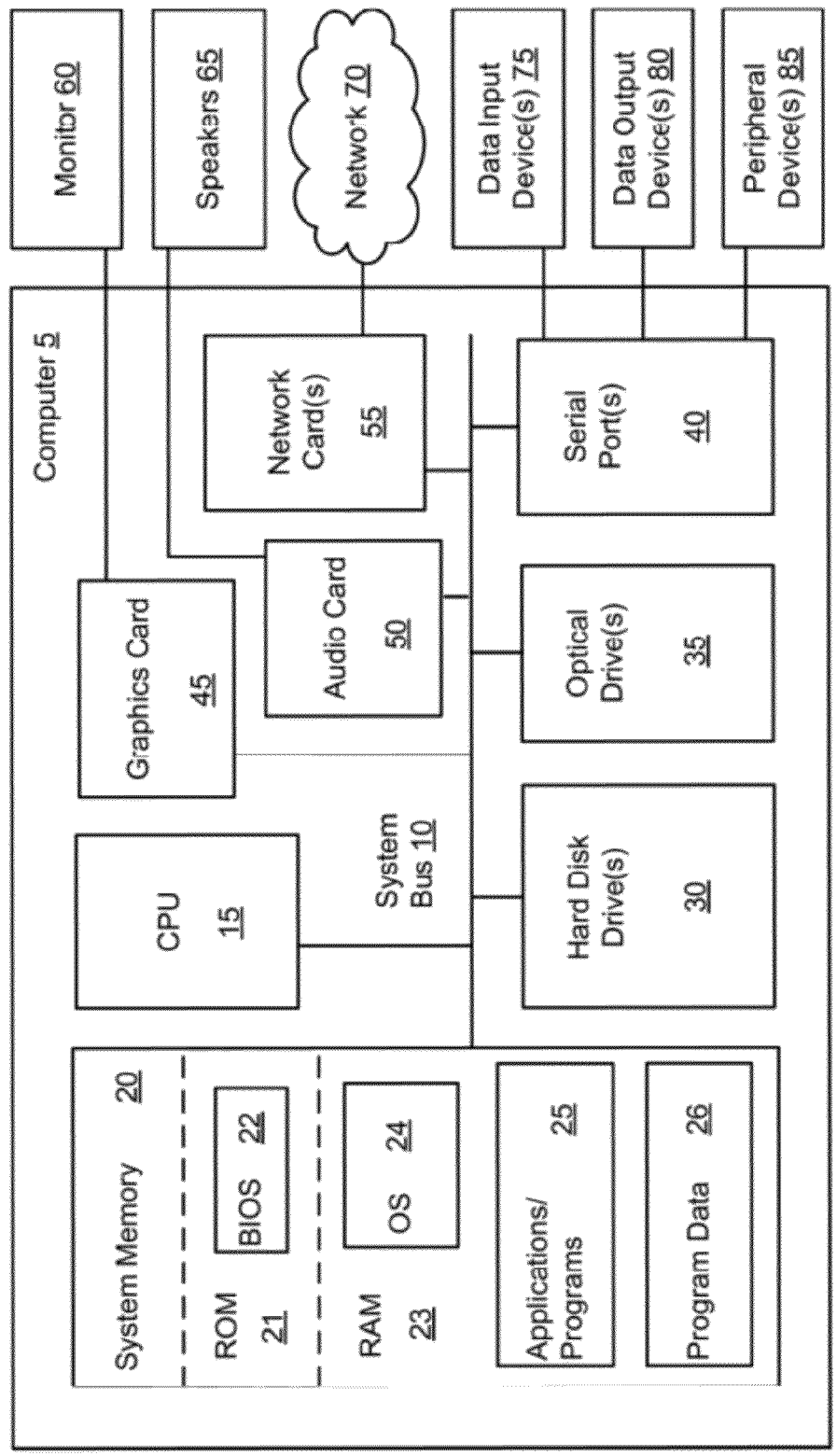
FIG. 20 illustrates a schematic diagram of a computer system according to one example embodiment.

FIG. 20 depicts one example embodiment of a computer system 5, such as a network server, suitable for implementing the embodiments of the systems of the present invention. In alternative embodiments, the systems of the present invention may be implemented in a personal computers, laptop computers, tablets, smart phones and other data processing devices. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting unknown security threats, the method comprising:
receiving from an antivirus application deployed on a user's computer information about an unknown security event associated with a software object executing on said computer, and a user's verdict indicating that the software object is harmful or harmless to the security of said computer;

identifying the user of said computer and a role of said user, wherein the user's role indicates user's level of expertise in the field of computer security;

if the role of said user indicates that the user has a high level of expertise in the field of computer security, accepting the user's verdict that the software object is harmful or harmless;

if the role of said user indicates that the user has a low level of expertise in the field of computer security, analyzing the information about the security event received from the antivirus application to verify that the user's verdict is correct; and if the user's verdict was accepted or verified to be correct, updating an antivirus database, which is associated with the antivirus application and contains information about known harmful and harmless software objects, with said information about the security event and indication that associated software object is harmful or harmless.

2. The method of claim 1 further comprising:

if the user's verdict was verified to be correct, increasing the user's level of expertise;

if the user's level of expertise reached a predefined threshold, increasing user's role.

3. The method of claim 1, wherein the user's level of expertise in the field of computer security is based on one or more of:

a total number of computer threats detected by said user;

a number of unique computer threats detected by said user;

a level of user proficiency with the antivirus software;

a frequency of infections of the computer of said user; and information about programs installed on the user's computer and the user's usage of said programs.

4. The method of claim 1 further comprising:

detecting an anomaly in the information received from the antivirus application by comparing the received information with a historical record of threats detected by the user;

decreasing the user's role based on detection of one or more anomalies.

5. The method of claim 1, wherein different roles have different associated weight coefficients, and wherein the user's verdict is given a higher or lower weight during verification of said user's verdict according to the weight coefficient associated with the role of said user.

6. The method of claim 1, wherein, if the information about the security event received from the antivirus application is not sufficient to verify that the user's verdict is correct or not, the processor is further configured to collect additional information about the security event and the associated software from the computer, wherein the additional information includes one or more of:

information about the security event generated by one or more different security modules of the antivirus application, each module performing a different antivirus analysis;

information about computer's software and hardware state at the time of occurrence of the security event; and the date, time and repeat frequency of the security event.

7. The method of claim 1, wherein the software object includes one of an executable file, a data file and a link.

8. A computer-based system for detecting unknown security threats, the system comprising:

a processor configured to:

receive from an antivirus application deployed on a user's computer information about an unknown security event associated with a software object executing on said computer, and a user's verdict indicating that the software object is harmful or harmless to the security of the computer;

identify the user of said computer and a role of said user, wherein the user's role indicates user's level of expertise in the field of computer security;

if the role of said user indicates that the user has a high level of expertise in the field of computer security, accept the user's verdict that the software object is harmful or harmless;

if the role of said user indicates that the user has a low level of expertise in the field of computer security, analyze the information about the security event received from the antivirus application to verify that the user's verdict is correct; and if the user's verdict was accepted or verified to be correct, update an antivirus database, which is associated with the antivirus application and contains information about known harmful and harmless software object, with said information about the security event and indication that associated software object is harmful or harmless.

9. The system of claim 8, wherein the processor is further configured to:

if the user's verdict was verified to be correct, increase the user's level of expertise;

if the user's level of expertise reached a predefined threshold, increase user's role.

10. The system of claim 8, wherein the user's level of expertise in the field of computer security is based on one or more of:

a total number of computer threats detected by said user;

a number of unique computer threats detected by said user;

a level of user proficiency with the antivirus software;

a frequency of infections of the computer of said user; and information about programs installed on the user's computer and the user's usage of said programs.

11. The system of claim 8, wherein the processor is further configured to:

detect an anomaly in the information received from the antivirus application by comparing the received information with a historical record of threats detected by the user;

decreasing the user's role based on detection of one or more anomalies.

12. The system of claim 8, wherein different roles have different associated weight coefficients, and wherein the user's verdict is given a higher or lower weight during verification of said user's verdict according to the weight coefficient associated with the role of said user.

13. The system of claim 8, wherein, if the information about the security event received from the antivirus application is not sufficient to verify that the user's verdict is correct or not, collecting additional information about the security event and the associated software from the computer, wherein the additional information includes one or more of:

information about the security event generated by one or more different security modules of the antivirus application, each module performing a different antivirus analysis;

information about computer's software and hardware state at the time of occurrence of the security event; and the date, time and repeat frequency of the security event.

14. The system of claim 8, wherein the software object includes one of an executable file, a data file and a link.

15. A computer program product embedded in a non-transitory computer-readable storage medium, the computer-readable storage medium comprising computer-executable instructions for detecting unknown security threats, the medium comprises instructions for:

receiving from an antivirus application deployed on a user's computer information about an unknown security event associated with a software object executing on said computer, and a user's verdict indicating that the software object is harmful or harmless to the security of the computer;

identifying the user of said computer and a role of said user, wherein the user's role indicates user's level of expertise in the field of computer security;

if the role of said user indicates that the user has a high level of expertise in the field of computer security, accepting the user's verdict that the software object is harmful or harmless;

if the role of said user indicates that the user has a low level of expertise in the field of computer security, analyzing the information about the security event received from the antivirus application to verify that the user's verdict is correct; and if the user's verdict was accepted or verified to be correct, updating an antivirus database, which is associated with the antivirus application and contains information about known harmful and harmless software object, with said information about the security event and indication that associated software object is harmful or harmless.

16. The product of claim 15 further comprises instructions for:

if the user's verdict was verified to be correct, increasing the user's level of expertise;

if the user's level of expertise reached a predefined threshold, increasing user's role.

17. The product of claim 15, wherein the user's level of expertise in the field of computer security is based on one or more of:

a total number of computer threats detected by said user;

a number of unique computer threats detected by said user;

a level of user proficiency with the antivirus software;

a frequency of infections of the computer of said user; and information about programs installed on the user's computer and the user's usage of said programs.

18. The product of claim 15 further comprises instructions for:

detecting an anomaly in the information received from the antivirus application by comparing the received information with a historical record of threats detected by the user;

decreasing the user's role based on detection of one or more anomalies.

19. The product of claim 15, wherein different roles have different associated weight coefficients, and wherein the user's verdict is given a higher or lower weight during verification of said user's verdict according to the weight coefficient associated with the role of said user.

20. The product of claim 15, wherein, if the information about the security event received from the antivirus application is not sufficient to verify that the user's verdict is correct or not, collecting additional information about the security event and the associated software from the computer, wherein the additional information includes one or more of:

information about the security event generated by one or more different security modules of the antivirus application, each module performing a different antivirus analysis;

information about computer's software and hardware state at the time of occurrence of the security event; and the date, time and repeat frequency of the security event.

* * * * *